(12) United States Patent
Aoki et al.

(10) Patent No.: US 7,891,066 B2
(45) Date of Patent: Feb. 22, 2011

(54) PLATE MATERIAL VERTICAL PROCESSING LINE

(75) Inventors: Yoshiaki Aoki, Kobe (JP); Keiji Tsujita, Kobe (JP); Morimasa Kuge, Kobe (JP); Takaaki Yokoyama, Kobe (JP); Takashi Sakurai, Kashiwa (JP); Michio Suzuki, Chiba (JP); Masayuki Anada, Kakegawa (JP); Masayuki Shinkai, Shizuoka (JP)

(73) Assignees: Kawasaki Plant Systems Kabushiki Kaisha, Hyogo (JP); Corning Japan K.K., Tokyo (JP)

( * ) Notice: Subject to any disclaimer, the term of this patent is extended or adjusted under 35 U.S.C. 154(b) by 931 days.

(21) Appl. No.: 10/589,928

(22) PCT Filed: Feb. 18, 2004

(86) PCT No.: PCT/JP2004/001787
§ 371 (c)(1),
(2), (4) Date: Jun. 5, 2007

(87) PCT Pub. No.: WO2005/077594
PCT Pub. Date: Aug. 25, 2005

(65) Prior Publication Data
US 2007/0271756 A1   Nov. 29, 2007

(51) Int. Cl.
B23P 23/00 (2006.01)
B08B 11/04 (2006.01)
B65G 49/06 (2006.01)
B65G 51/02 (2006.01)

(52) U.S. Cl. .......................... 29/38.9; 29/564; 349/187; 198/495; 198/860.2; 198/861.1; 83/98; 83/438; 83/449; 225/96.5; 134/64 R; 134/122 R; 134/199; 409/138; 409/173

(58) Field of Classification Search .................. 29/563, 29/33 P, 564, 33 R, 561, 38.9, 33 H, 742, 29/759; 198/495, 860.2, 861.1; 134/64 R, 134/122 R, 199; 409/138, 145, 158, 159, 409/161, 170, 172–173; 83/24, 98, 420, 83/438, 448, 449; 225/2, 96, 96.5; 349/187
See application file for complete search history.

(56) References Cited

U.S. PATENT DOCUMENTS 3,729,083 A * 4/1973 Wollenhaupt et al. .... 198/345.3

(Continued)

FOREIGN PATENT DOCUMENTS

DE            3232451 C1 * 12/1983

(Continued)

OTHER PUBLICATIONS

Machine Translation of JP 05-036658, which JP '658 reference was published on Feb. 12, 1993.*
Machine Translation of JP 2002-308422, which JP '422 reference was published on Oct. 23, 2002.*
Machine Translation of JP 07-223831, which JP '831 reference was published on Aug. 22, 1995.*

(Continued)

*Primary Examiner*—Erica E Cadugan
(74) *Attorney, Agent, or Firm*—Fitch, Even, Tabin & Flannery

(57) ABSTRACT

A plate material vertical processing line that is capable of subjecting large-sized and thinned glass plates to scribing, venting, etc without degrading their quality, comprises a plurality of processing devices each having a modular structure; wherein each of the processing devices includes a platform; a belt conveyor that is mounted on the platform and is configured to convey a glass plate placed in a substantially upright position while supporting a lower end of the glass plate; and a fluid guide that is mounted on the platform and is configured to apply a fluid pressure to a surface of the glass plate to support the glass plate in the substantially upright position and in a non-contact state; and wherein the processing devices include a combination of at least two processing devices selected from a scribing device, a venting device, a chamfering device, a cleaning agent washing device, a water washing device, a high-pressure water spray device, and a glass plate turn device.

14 Claims, 21 Drawing Sheets

U.S. PATENT DOCUMENTS

| | | | | |
|---|---|---|---|---|
| 4,172,513 | A | * | 10/1979 | Bradstreet et al. ........... 198/380 |
| 4,796,341 | A | * | 1/1989 | Kuhn, II ...................... 29/33 P |
| 5,027,941 | A | * | 7/1991 | Lenhardt ..................... 198/721 |
| 5,836,809 | A | * | 11/1998 | Kosic ........................... 451/89 |
| 5,909,906 | A | * | 6/1999 | Bortolini .................... 29/26 A |
| 7,252,188 | B2 | * | 8/2007 | Lisec ....................... 198/474.1 |
| 7,437,810 | B2 | * | 10/2008 | Ota ............................. 29/33 P |
| 7,555,823 | B2 | * | 7/2009 | Arai ............................. 29/563 |
| 2005/0199493 | A1 | * | 9/2005 | Bangert et al. ......... 204/298.23 |
| 2008/0003091 | A1 | * | 1/2008 | Bonora .................... 414/749.6 |
| 2010/0078295 | A1 | * | 4/2010 | Kudva et al. ................ 198/617 |
| 2010/0126830 | A1 | * | 5/2010 | Kudva et al. ................ 198/493 |

FOREIGN PATENT DOCUMENTS

| | | | |
|---|---|---|---|
| DE | 3308079 A1 | * | 9/1984 |
| JP | 05-036658 | | 1/1993 |
| JP | 05-269699 | | 10/1993 |
| JP | 06-246559 | | 9/1994 |
| JP | H07-223831 A | | 8/1995 |
| JP | 07-251362 | | 10/1995 |
| JP | 08-057436 A | * | 3/1996 |
| JP | 08-059269 | | 3/1996 |
| JP | 09-330898 | | 12/1997 |
| JP | 10-118583 A | * | 5/1998 |
| JP | 11-106030 | | 4/1999 |
| JP | H11-100121 A | | 4/1999 |
| JP | 2000-072219 A | * | 3/2000 |
| JP | 2000-233830 | | 8/2000 |
| JP | 2001-213517 | | 8/2001 |
| JP | 2002-308422 A | | 10/2002 |
| JP | 2002-308423 A | | 10/2002 |
| JP | 2003-192127 | | 7/2003 |

OTHER PUBLICATIONS

An International Search Report dated May 25, 2004, from the Japanese Patent Office in corresponding Japanese Application No. PCT/JP2004-001787.

A search report dated Jul. 31, 2007, from the European Patent Office in corresponding European Application No. EP 04 71 2178.

* cited by examiner (a)

(b)

(a)

(b)

(a)

(b)

PLATE MATERIAL VERTICAL PROCESSING LINE

TECHNICAL FIELD

The present invention relates to a plate material vertical processing line. More particularly, the present invention relates to a plate material vertical processing line that processes plate materials such as rare metal plate materials, silicon plate materials, or flat display glasses by scribing scribe lines on surfaces thereof, venting the plate materials along the scribe lines, washing the surfaces thereof, etc.

BACKGROUND ART

Conventionally, glass plates are used in various fields. In particular, glass plates (also referred to as glass substrates) for use with liquid crystal displays, plasma displays, etc are very thin. The glass plates with a thickness of about 0.7 mm and a size of about 550 mm×650 mm are often manufactured. The glass substrate is typically conveyed in a horizontal position (lying position) by a belt conveyor or the like and is subjected to processing such as trimming or venting in the horizontal position in the respective devices (see for example, Japanese Laid-Open Patent Application Publication No. Hei. 8-59269).

In addition, there has been disclosed an apparatus that conveys the glass plate in a substantially upright position, leaning against roller trains, and, in this state grinds each of the edges of the glass plate (see e.g., Japanese Patent Publication No. 2623476). These apparatuses are fixedly mounted to an installation floor surface.

In recent years, in fields of glass substrates and so on, there has been a need for larger-sized glasses so that a yield increases for improved productivity or the glasses are incorporated into larger displays and so on. In addition, there has been a need for improved transportability of displays and so on by thinning the glass substrate. So, the present trend is toward the production of thinner glasses. Furthermore, there have been increasing demands for a higher quality and for a lower cost of the glass substrates.

In the technique for conveying and processing the glass plate in the horizontal position and in the technique for processing the glass plate in the substantially upright position, leaning against some structural members, the larger and thinner glass plate may be broken due to deflection because of its own weight, or due to a reactive force applied from the structural members that convey the glass plate while supporting the surface thereof, when it is processed. The larger glass plate horizontally laid causes an increase in an installation area of the apparatus, and an increase in the size of the apparatus, resulting in an increased cost. In addition, maintenance becomes difficult because of an increase in a width of the apparatus. Moreover, in the system in which processing units or washing units are fixedly mounted, it is difficult to change the line quickly depending on how the plate material is processed.

DISCLOSURE OF THE INVENTION

The present invention has been developed in order to solve the above mentioned problems, and an object of the present invention is to provide a plate material vertical processing line that is able to subject plate materials such as large-sized and thinned glass plate to scribing, venting, washing, chamfering, and so on, without deteriorating their qualities.

A plate material vertical processing line of the present invention comprises a plurality of processing devices each having a modular structure; wherein each of the processing devices includes a platform; a conveyance means that is mounted on the platform and is configured to convey a plate material placed in a substantially upright position while supporting a lower end of the plate material; and a fluid guide that is mounted on the platform and is configured to apply a fluid pressure to a surface of the plate material to support the plate material in the substantially upright position and in a non-contact state; and wherein the processing devices include a combination of at least two processing devices selected from a scribing device, a venting device, a chamfering device, a cleaning agent washing device, a water washing device, a high-pressure water spray device, and a plate material turn device.

In accordance with the plate material vertical processing line having such a construction, since the processing devices having modular structures are coupled as desired, it is possible to construct a desired vertical processing line. In addition, since the plate material is conveyed and processed in the substantially upright position, an installation space of the processing line can be saved.

According to another aspect of the present invention, a plate material vertical processing line comprises: processing units of a plate material; and a plurality of conveyance devices each having a modular structure; wherein each of the conveyance devices includes: a platform; a conveyance means that is mounted on the platform and is configured to convey the plate material placed in a substantially upright position while supporting a lower end of the plate material; a fluid guide that is mounted on the platform and is configured to apply a fluid pressure to a surface of the plate material to support the plate material in the substantially upright position and in a non-contact state; and a mounting element that is mounted on the platform to mount each of the processing units; wherein the processing units include a combination of at least two processing units selected from a scribing unit, a venting unit, a chamfering unit, a cleaning agent washing unit, a water washing unit, a high-pressure water spray unit, and a plate material turn unit.

In accordance with the vertical processing line having such a construction, it is possible to construct a desired vertical processing line and save an installation space of the processing line as in the above described vertical processing line. In addition, by changing the processing units, the processing devices can be changed.

Preferably, the plate material vertical processing line may further comprise a direction conversion device of the plate material including the platform; the conveyance means that conveys the plate material in the substantially upright position while supporting the lower end of the plate material; the fluid guide that supports the plate material in the non-contact state; and a direction conversion means that is mounted on the platform and is configured to convert direction of the conveyance means and the fluid guide within a horizontal plane. Thereby, the direction in which the plate material is conveyed in the processing line can be easily changed. Preferably, the plate material vertical processing line may further comprise an acid treatment device of the plate material including the platform; the conveyance means that is mounted on the platform and is configured to convey the plate material placed in the substantially upright position while supporting the lower end of the plate material; and an acid treatment means that is mounted on the platform and is configured to subject the surface of the plate material to acid treatment. Thereby, surface treatment using an acid can be performed as well as shape forming or washing of the plate material.

Preferably, the plate material vertical processing line may further comprise: a tiling device of the plate material including the platform; the conveyance means that is mounted on the platform and is configured to convey the plate material placed in the substantially upright position while supporting the lower end of the plate material; and the fluid guide capable of being tilted in a direction perpendicular to the surface of the plate material. Thereby, the plate material to be processed can be conveyed in a slightly tilted position from a vertical position. In addition, the plate material placed in a horizontal position can be carried into the processing line in the substantially upright position, and can be carried out therefrom in a tilted position.

Preferably, the plate material vertical processing line may further comprise: a parallel-shift device of the plate material including the platform; the conveyance means that conveys the plate material placed in the substantially upright position while supporting the lower end of the plate material; the fluid guide that supports the plate material in the non-contact state; and a linear reciprocation means that is mounted on the platform and is configured to move the conveyance means and the fluid guide in a direction perpendicular to a direction in which the plate material is conveyed. In accordance with the vertical processing line, the processing line can be branched into plural lines.

Preferably, the platform may have casters at a lower end thereof. By moving the processing devices, change of the processing line can be easily achieved. Preferably, each of the processing devices may have a coupling member by which the each processing device is removably coupled to its adjacent processing device. By moving the processing devices, change of the processing line can be easily achieved.

Hereinafter, an embodiment of the plate material vertical processing line according to the present invention will be described with reference to the accompanying drawings.

BRIEF DESCRIPTION OF THE DRAWINGS

FIGS. 1 to 4 illustrates four parts of the embodiment of the vertical processing line of the present invention along the direction in which the glass plate to be processed is conveyed.

BEST MODE FOR CARRYING OUT THE INVENTION

A processing line 1 is intended for glass plates. The present invention may be applied to various plate materials such as plate materials formed of rare metal or silicon, as well as the glass plate. FIGS. 1 to 4 illustrate that processing devices constituting the processing line 1 are coupled to one another in the direction in which the glass plate is conveyed. As described later, the respective devices have belt conveyors which are conveyance means that support a lower end of a rectangular glass devices. The glass plate is conveyed in a substantially upright position to the respective processing devices. Fluid guides and acid treatment rollers support the glass plate in the substantially upright position as described later.

Figure 1:
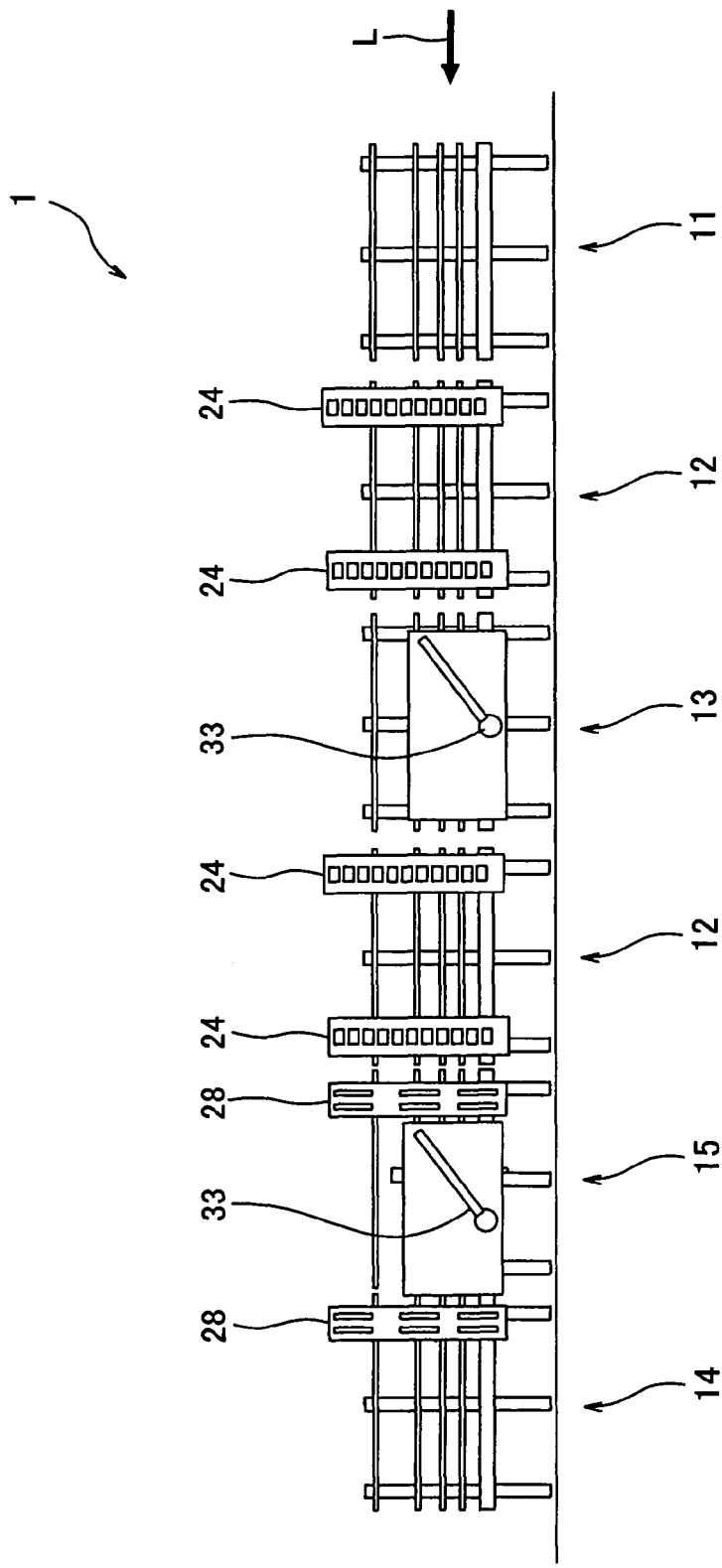
FIG. 1 is a front view schematically showing a part of a glass plate processing line according to an embodiment of the present invention.

Turning to FIG. 1, a carry-in device 11 that carries the glass plate into the processing line 1, a scribing device 12 that scribes venting scribe lines on the glass plate, a turn device 13 that turns the glass plate forward and backward (conveyance direction of the glass plate, direction of a pass line L) within a plane thereof, a second scribing device 12, a device 15 constructed such that the turn device 13 and the venting device 14 that vents the glass plate along the scribe line are integrally mounted, and the venting device 14, which are coupled to one another and aligned in this order.

Figure 2:
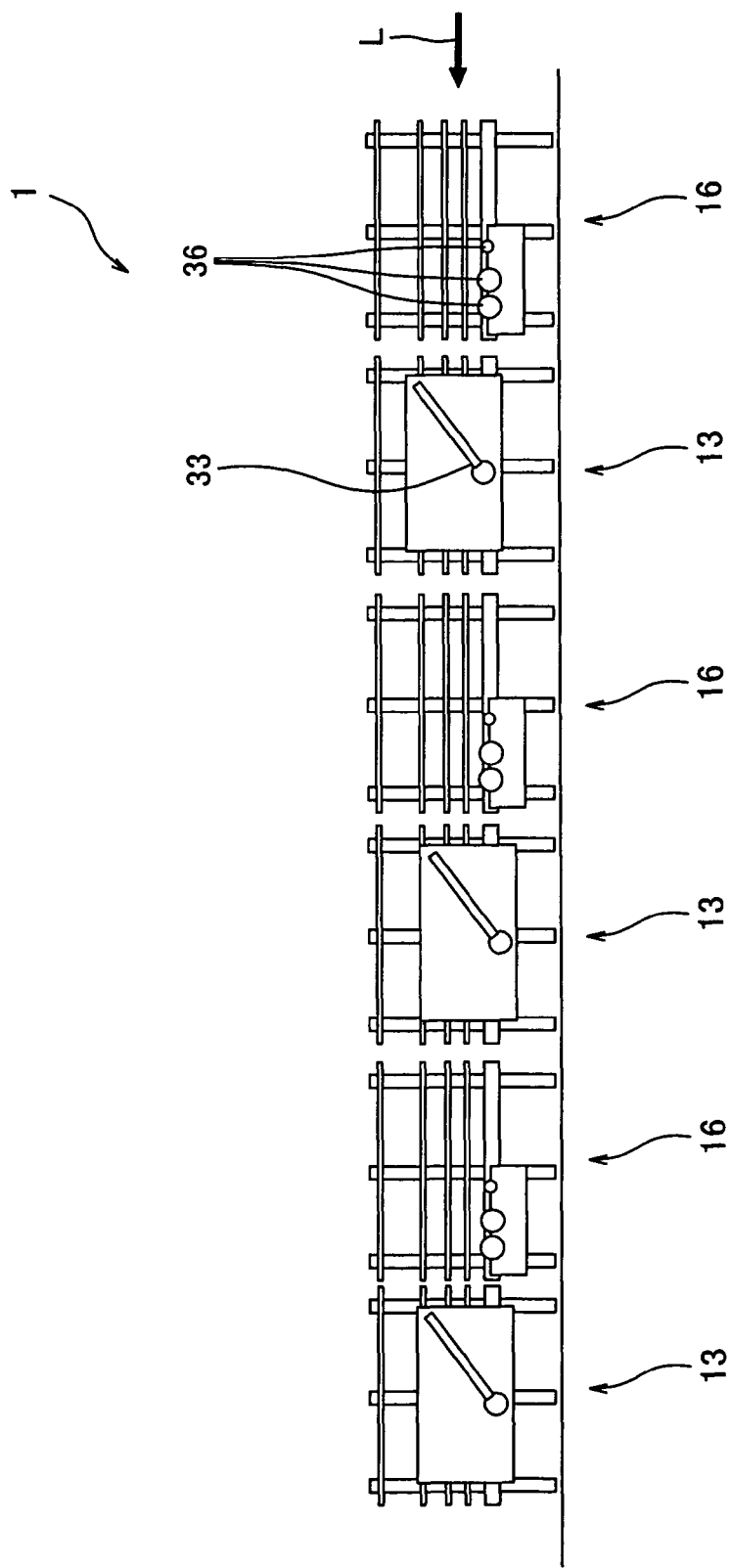
FIG. 2 is a front view schematically showing another part of the glass plate processing line according to the embodiment of the present invention.

Continuously with the line illustrated in FIG. 1, as shown in FIG. 2, a chamfering device 16 that chamfers corner portions or edge portions of the rectangular glass plate, the turn device 13, the chamfering device 16, the turn device 13, the chamfering device 16, and the turn device 13 are coupled to one another and aligned in this order.

Figure 3:
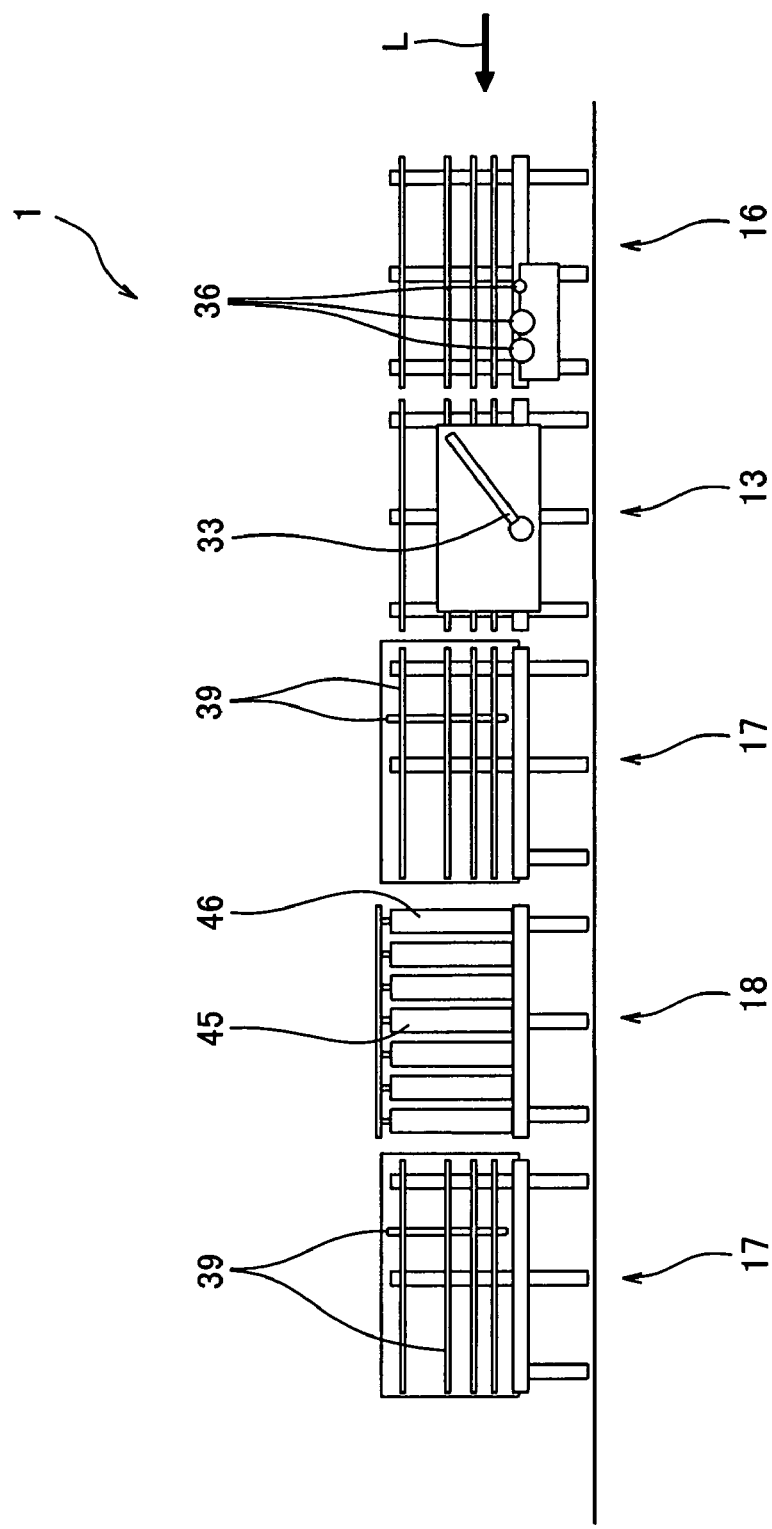
FIG. 3 is a front view schematically showing another part of the glass plate processing line according to the embodiment of the present invention.

Continuously with the line illustrated in FIG. 2, as shown in FIG. 3, the chamfering device 16, the turn device 13, a water washing device 17 that washes the surface of the glass plate by using water, an acid treatment device 18 that subjects the surface of the glass plate to acid treatment using an acid treatment liquid, and the water washing device 17 are coupled to one another and aligned in this order.

Figure 4:
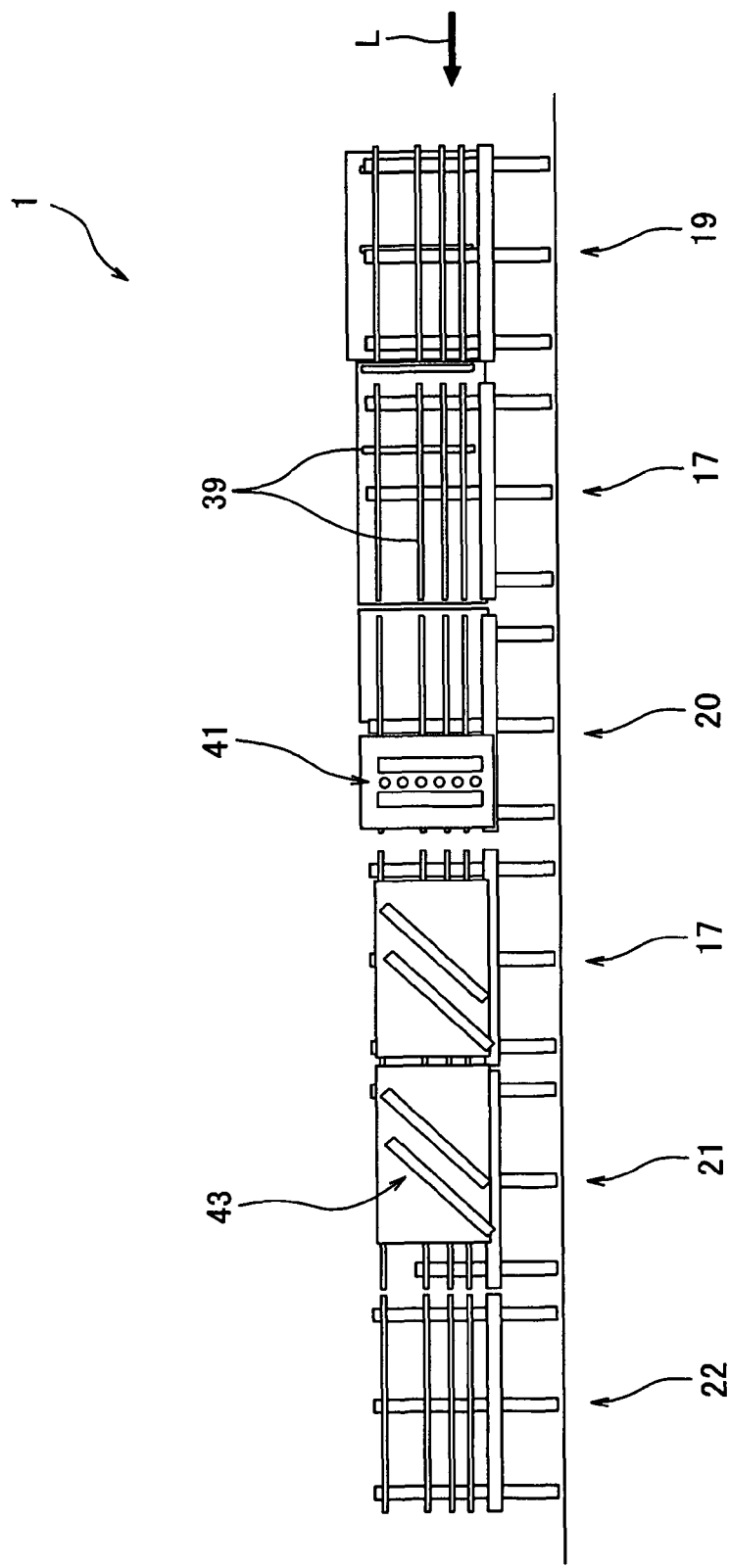
FIG. 4 is a front view schematically showing another part of the glass plate processing line according to the embodiment of the present invention.

Continuously with the line illustrated in FIG. 3, as shown in FIG. 4, a cleaning agent washing device 19 that washes the surface of the glass plate by using a cleaning liquid, the water washing device 17, a high-pressure water spray device 20 that washes the surface of the glass plate by a high-pressure water spray, the water washing device 17, a water removing device 21 that removes water from the surface of the glass plate by air knife to turn it to a dry state, and a carry-out device 22 that carries out the glass plate outside the processing line 1, are coupled to one another and aligned in this order.

Figure 21:
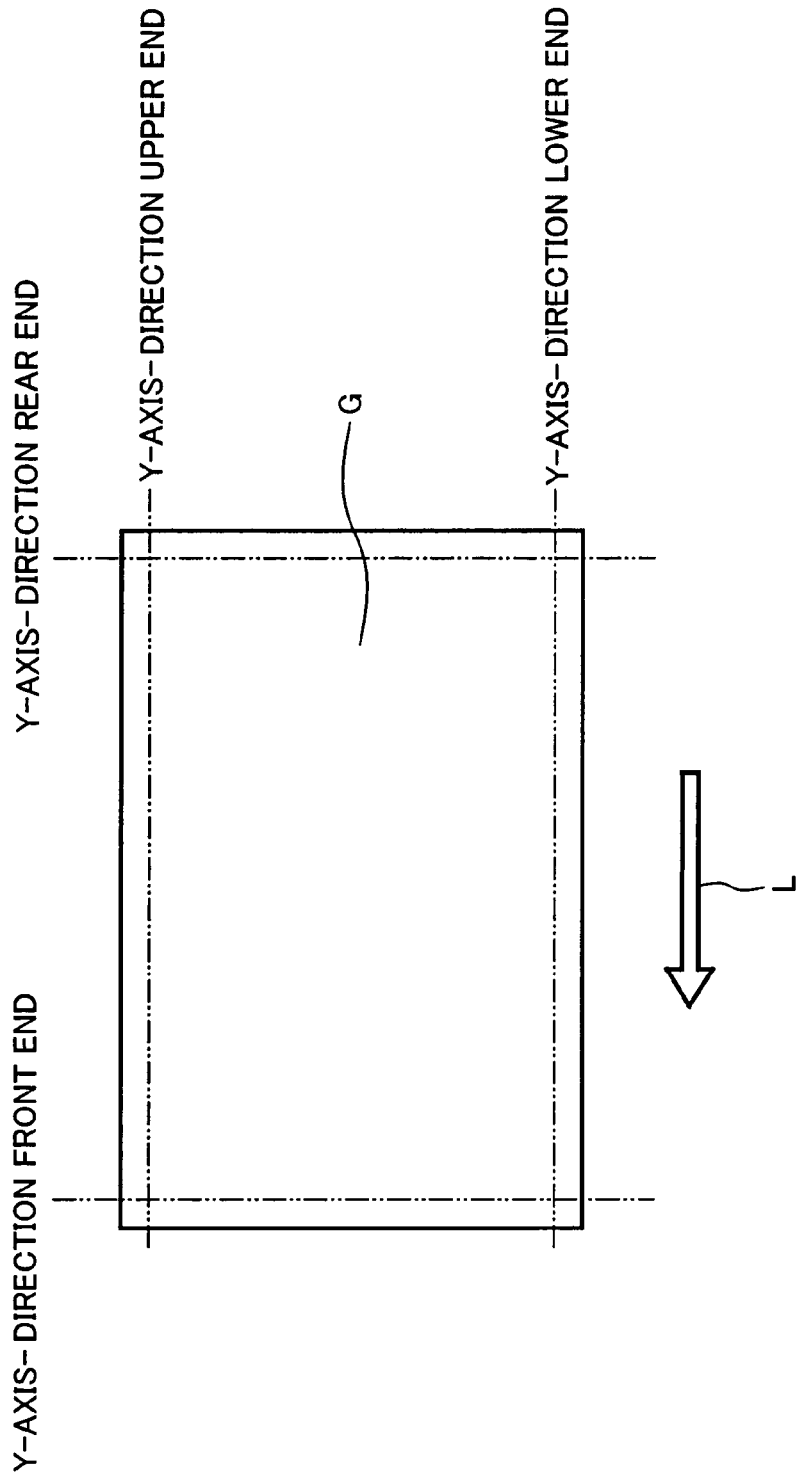
FIG. 21 is a plan view showing a configuration of the glass plate to be processed by the glass plate processing line according to the embodiment of the present invention.

Below, a processing operation of a glass plate G (illustrated in FIG. 21) in the processing line 1 of FIGS. 1 to 4 will be described. First, the glass plate G is carried into the carry-in device 11 of FIG. 1 in a substantially upright position. For example, when the glass plate is conveyed in a horizontal position and is raised to a substantially upright position to be introduced into the processing line 1, a tilting device as described later is desirably used as the carry-in device. Then, the glass plate is conveyed to the scribing device 12, where a scribing unit 24 located at a downstream end scribes a scribe line on a front end in Y-axis-direction. Then, the scribing unit 24 located on an upstream end scribes a scribe line on a rear end in Y-axis-direction. In this case, the belt conveyor in some cases causes the glass plate to move forward and backward according to the size of the glass plate. Then, the turn device 13 turns the glass plate G by 90 degrees. Then, the glass plate G is conveyed to the second scribing device 12, which scribes scribe lines on the remaining two edges (upper and lower ends in X-axis-direction before turning in FIG. 21). Then, the device 15 including the turn device 13 and the venting device 14 vents (trims) front and rear ends in X-axis-direction. In this case, since one venting unit 28 trims the two edges in X-axis-direction, the glass plate is caused to move forward and backward by the belt conveyor. Then, the turn unit 33 turns the glass plate G by 90 degrees. Then, the venting device 14 trims the remaining two edges (front and rear ends in Y-axis-direction of FIG. 21). Alternatively, scribe lines may be scribed on an intermediate region of one glass plate (material glass) and the glass plate may be vented along the scribe lines to create plural glass products.

Then, as shown in FIG. 2, the first chamfering device 16 chamfers corners of a lower portion of a front end, of four corners, and a lower edge to form curved faces and remove corners). Then, the turn devices 13 and the chamfering devices 16 which are alternately aligned, turn the glass plate G by 90 degrees and chamfer the remaining three corners and three edges.

As shown in FIG. 3, after the chamfering is completed, the glass plate G is conveyed to the water washing device 17, which washes away the surface of the glass plate G to remove dust or cullet particles from the surface by water flow. Then, the acid treatment device 18 subjects one surface of the glass plate G to acid treatment. Then, the water washing device 17 located downstream washes (rinses) the glass plate G by water to wash away the acid treatment liquid from the surface.

Then, as shown in FIG. 4, the cleaning agent washing device 19 removes oil and so on from the surface of the glass plate G. Then, the water washing device 17 washes away the cleaning liquid. Then, the high-pressure water spray device 20 sprays the water to the glass plate G to blow away particles adhering to the surface or dusts floating in the water together with the water. Thereafter, the water washing device 17 performs finishing water washing. Then, the water removing device 21 blows away the water from the surface of the glass plate G, causing the glass plate G to turn to a dry state. Then, the carry-out device 22 carries out the processed glass plate G. In this case, when the glass plate being conveyed in the substantially upright position is tilted to the horizontal position and carried out, the tilting device is desirably used as the carry-out device.

The above mentioned arrangement and processing operations are merely exemplary, and devices and processing steps may be omitted and added as necessary. Whereas the scribing units (reference number 24 in FIG. 8) are mounted at front and rear ends of the scribing device 12 of FIG. 1, one scribing element may alternatively be mounted. In the illustrated construction of FIGS. 1 and 2, the plurality of turn devices 13 and the chamfering devices 16 are alternately disposed, one turn device 13 and one chamfering device 16 may alternatively be disposed. In that case, the glass plate G is processed in such a manner that it is turned and is moved backward repeatedly. This increases the time required to process one glass plate, but an installation space of the line can be saved and the number of units can be reduced. This applies to scribing and venting. To simplify the line, desirably, one scribing device 12 is disposed upstream and adjacent the one turn device 13 and one venting device 14 is disposed downstream and adjacent that one turn device 13. However, the time required for the steps becomes longer than that of the illustrated line. Whereas a direction conversion device 51 and a parallel-shift device 54 which are described later, are not coupled to the processing line 1, they may be installed as necessary.

Figure 5:
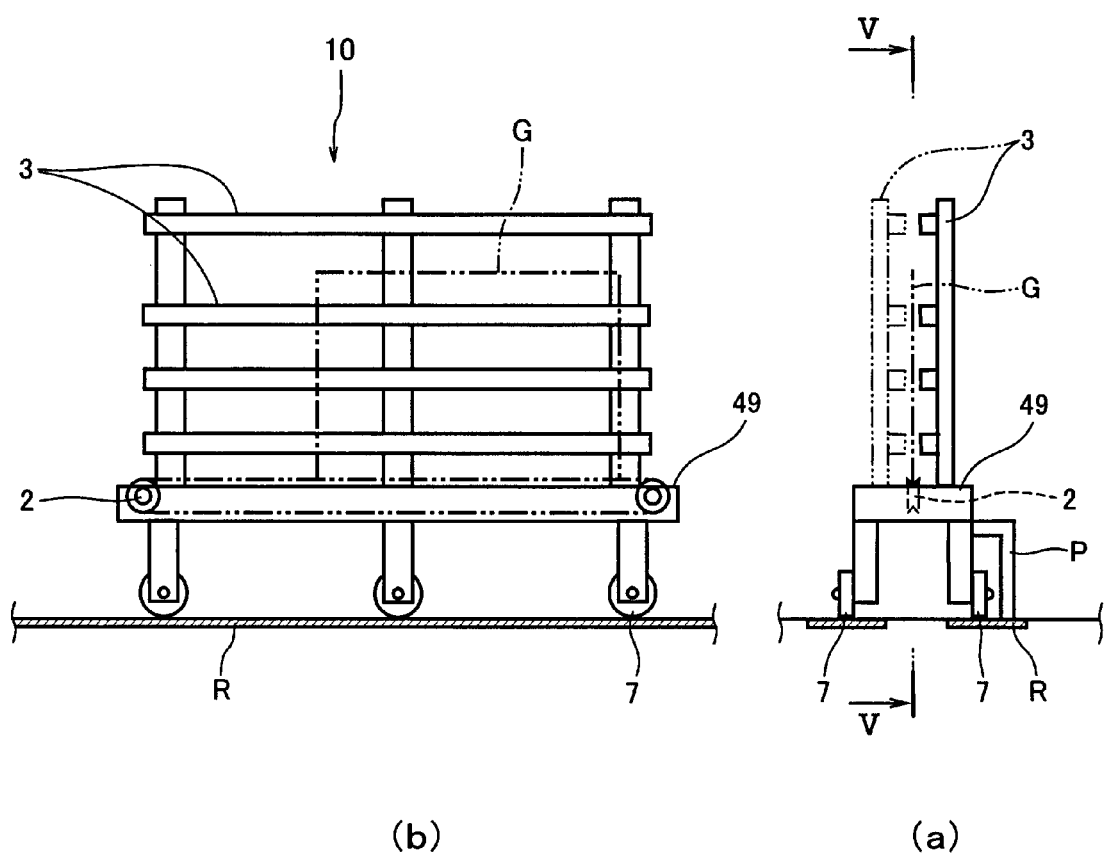
FIG. 5(a) is a side view showing an example of a conveyance device which is a base body of each processing device in the processing line of FIG. 1
FIG. 5(b) is a view taken in the direction of arrows along line V-V of FIG. 5(a)

FIG. 5 shows a conveyance device 10 which becomes a base (framework) constituting the above mentioned devices. The conveyance device 10 includes a platform 49 to which a belt conveyor 2 is mounted to convey the rectangular glass plate G horizontally while supporting a bottom of the glass plate G in the substantially upright position. Instead of the belt conveyor, a known conveyor such as a roller conveyor may be employed. Fluid guides 3 are vertically mounted to the platform 49 on one side or on both sides of the pass line L along the direction in which the belt conveyor 2 conveys the glass plate G to support the surface of the glass plate G in a non-contact state.

In FIG. 5, P denotes standard position setting metal members embedded in a reference floor surface on which the processing line 1 is installed. The reference metal members P are disposed with an equal pitch in the longitudinal direction of the processing line 1. Based on the reference metal members P, the devices can be arranged easily and orderly. R denotes a metal plate member attached to the floor surface to enable the device with casters 7 to easily move thereon.

Figure 6:
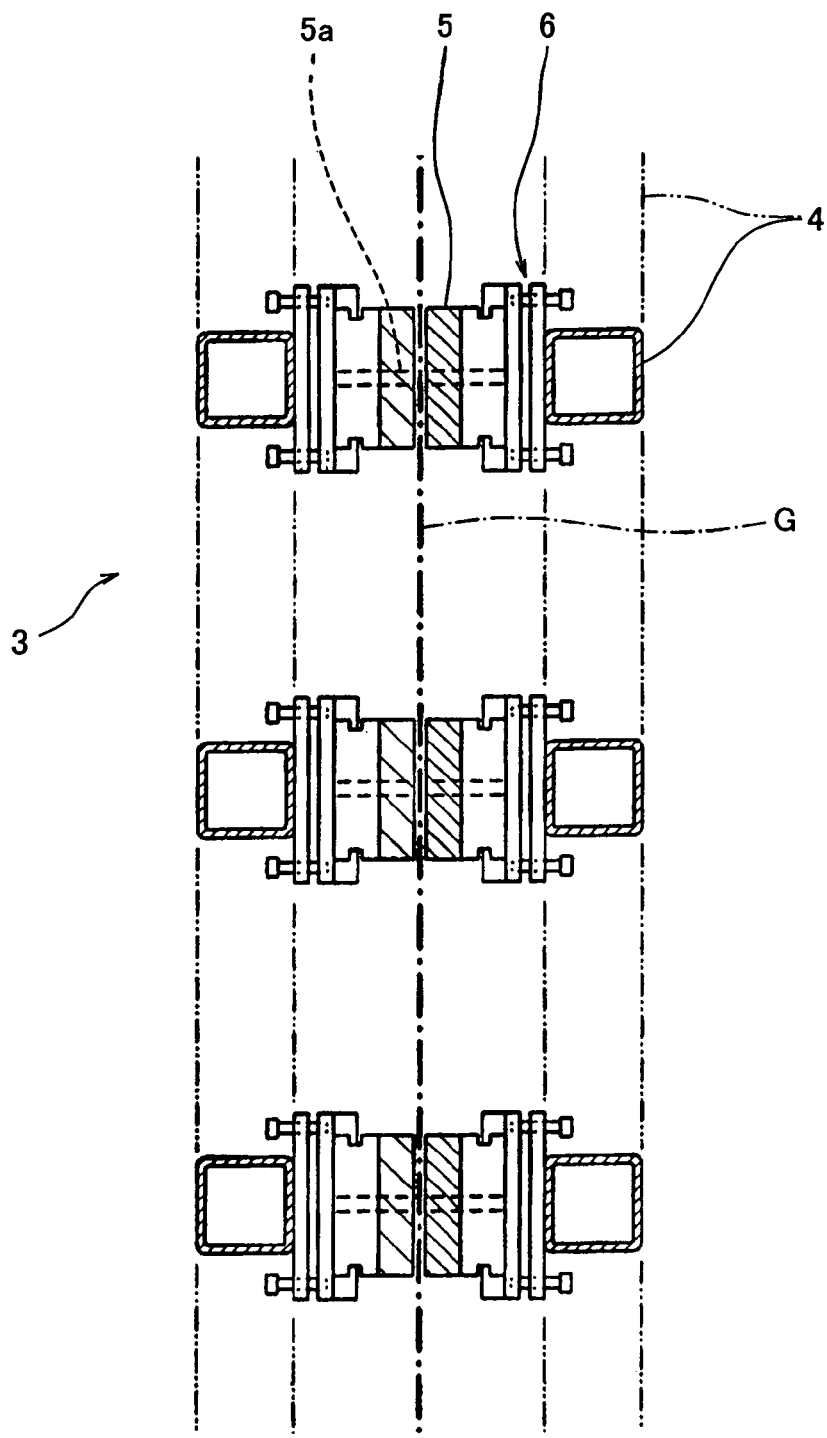
FIG. 6 is a transverse sectional view showing a fluid guide of the conveyance device of FIG. 5.

As shown in FIG. 6, the fluid guide 3 includes a frame member 4 and a fluid ejecting portion 5 mounted to the frame member 4 by adjusting members 6. The fluid ejecting portion 5 serves to apply a fluid pressure to the surface of the glass plate G for supporting the glass plate G. The fluid ejecting portion 5 is adjustable to be entirely parallel to the surface of the glass plate G by the adjustment member 6. The fluid ejecting portion 5 has fluid ejecting holes 5a which are arranged to be spaced apart from one another to allow the fluid to be ejected therethrough toward the surface of the glass plate G.

In a case where the fluid guides 3 are mounted on right and left sides with respect to the pass line L, the fluid pressures applied to both surfaces of the glass plate G are balanced, enabling the glass plate G to be maintained in a substantially vertical position without contacting any structure members. Whereas the water is used as the fluid for supporting the glass plate G, a dry gas may alternatively be used. Nonetheless, by using a liquid as the supporting fluid, the cullet particles, the dust, etc can be easily effectively removed from the glass plate G. In a case where the fluid guide 3 is mounted only on one side of the pass line L, the glass plate G is slightly tilted toward the fluid guide 3 and is supported in a non-contact state by a balance between a lateral component of the weight of the glass plate G and the force of the fluid pressure of the ejected fluid. Alternatively, the fluid guide 3 may be inclined slightly. Instead of the fluid guide 3 having the fluid ejecting holes 5a, a porous fluid guide formed of a porous material may be mounted to ooze out liquid to a guide surface. The surface tension of the guide liquid forms a liquid layer with a constant thickness in a gap between the porous fluid guide and the glass plate, enabling the glass plate to be supported without contacting any structural members.

The conveyance device 10 has the casters 7 at a lower end thereof to enable each device to easily move. The conveyance device 10 is equipped with a mounting element by which the processing unit for processing the glass plate G is mounted thereto. The processing unit include a scribing unit for scribing venting scribe lines on the glass plate, a venting unit for venting the glass plate along the scribe lines formed thereon, a chamfering unit for chamfering corners or edges of the rectangular glass plate G, a cleaning agent washing unit for washing the surface of the glass plate G by a cleaning liquid, a water washing unit for washing the surface of the glass plate G by the water, a high-pressure water spray unit for washing the surface of the glass plate G by the high-pressure water spray, a water removing unit for removing water from the surface of the glass plate G by a high-pressure air jet, and a turn unit for turning the glass plate G within a plane thereof. These units are mounted to the conveyance devices 10, thus constituting the above devices 12, 13, 14, 15, 16, 17, 19, 20, and 21.

In this embodiment, no units are mounted to the carry-in device 11 and the carry-out device 22. The conveyance devices 10 which are the bases are used as the carry-in device 11 and the carry-out device 22. The mounting elements may be configured to allow these processing units to be removably mounted.

Figure 7:
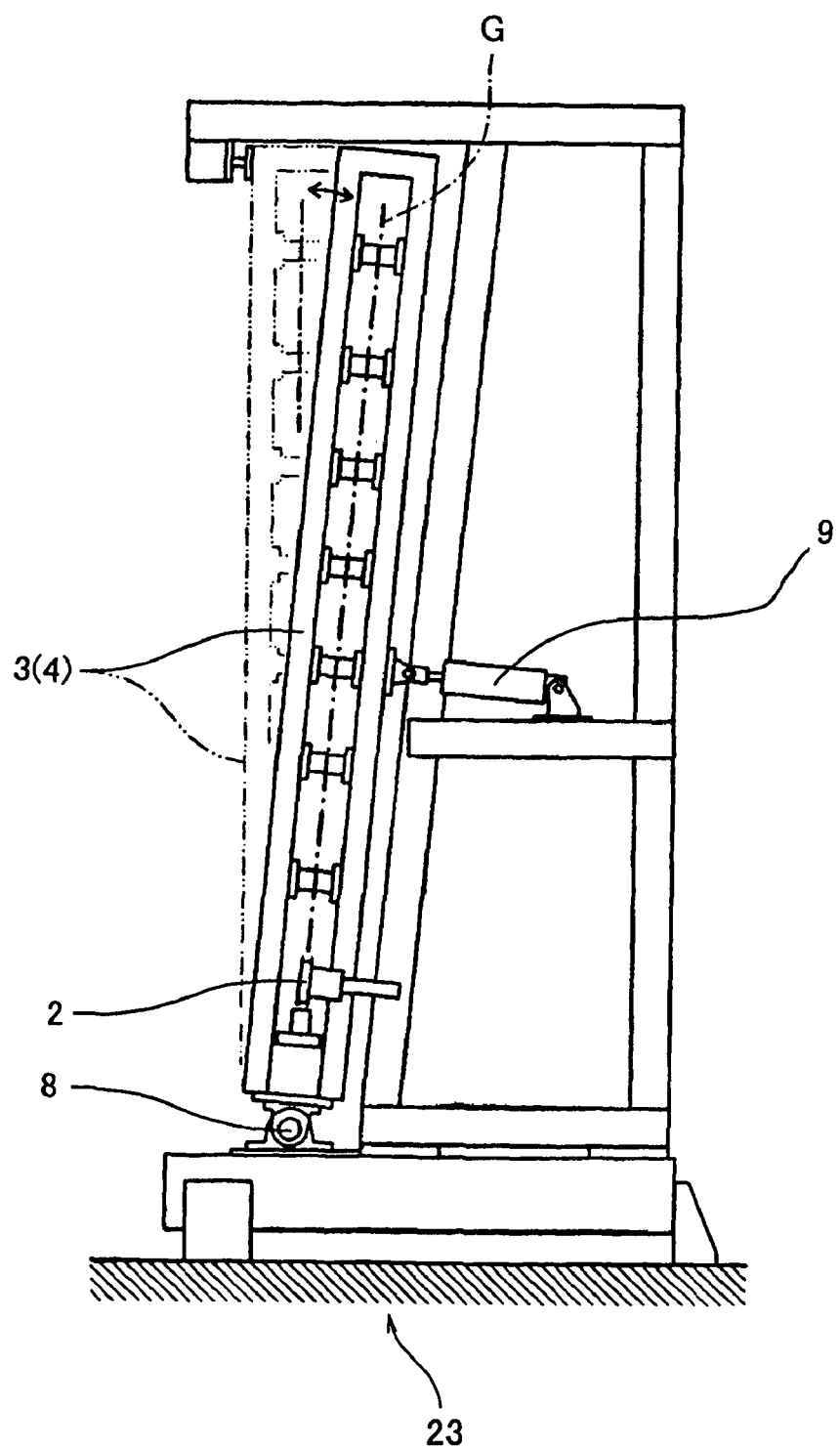
FIG. 7 is a side view showing an example of a tilting device applied to the glass plate processing line according to the embodiment of the present invention.

FIG. 7 shows a tilting device 23 configured to tilt the glass plate G from vertical in a direction perpendicular to the surface of the glass plate G while supporting a lower end of the glass plate G by the belt conveyor 2. The tilting device 23 may be used as the carry-in device 11 and the carry-out unit 12. The tilting device 23 may be inserted into and coupled to a required portion in the line 1. As shown in FIG. 7, the tilting device 23 is constructed such that the fluid guides 3 on both sides (or on one side) of the pass line L are slightly tilted outward from vertical, i.e., away from the pass line L. The frame member 4 constituting the fluid guide 3 is tilted around a rotational shaft 8 at a lower end thereof by a drive cylinder 9. Instead of the drive cylinder 9, other known drive system may be employed. By increasing a stroke of the drive cylinder 9 or by setting a pivot of the fluid guide 3 higher than the lower end of the fluid guide 3, the fluid guide 3 can be tilted by a greater angle (e.g., 90 degrees). In this case, as described above, it is possible to raise the glass plate G from the horizontal position to the vertical position while the glass plate G is carried into the processing line 1 and to let the glass plate G down to the horizontal position while the glass plate G is carried out from the line 1.

The tilting device 23 is used as the carry-in device 11 to tilt the glass plate G by an angle conforming to the processing unit located downstream in a case where the line 1 is configured to process the glass plate G in a slightly tilted position. In addition, the tiling device 23 is used as the carry-out device 22 in order to raise the glass plate G in the tilted position to a substantially vertical position and carry out the glass plate G in the substantially vertical position. In a case where a part of the processing devices is/are coupled to the line 1 to process the glass plate G in the tilted position, the tilting devices 23 are coupled to upstream and downstream sides of that/those processing devices.

The conveyance devices 10, which are the bases, are in some cases coupled to the line 1 without mounting the processing units thereto, in addition to the carry-in device 11 and the carry-out device 22 so that they are used as a buffer or a passage space for the purpose of maintaining a cycle time. Coupling members (not shown) are mounted to the conveyance device 10. The coupling members serve to couple other conveyance units to upstream ends and downstream ends of that conveyance device 10.

In this embodiment, each of the scribing device 12, the turn device 13, the venting device 14, the turn and venting device 15, and the chamfering device 16 includes the fluid guide 3 only on one side of the pass line L so that the associated processing unit is mounted to the other side. The fluid guide 3 is not mounted to the acid treatment device 18. This is because a plurality of acid treatment rollers 45 are arranged along the direction of the pass line L and serve as the fluid guide.

Figure 8:
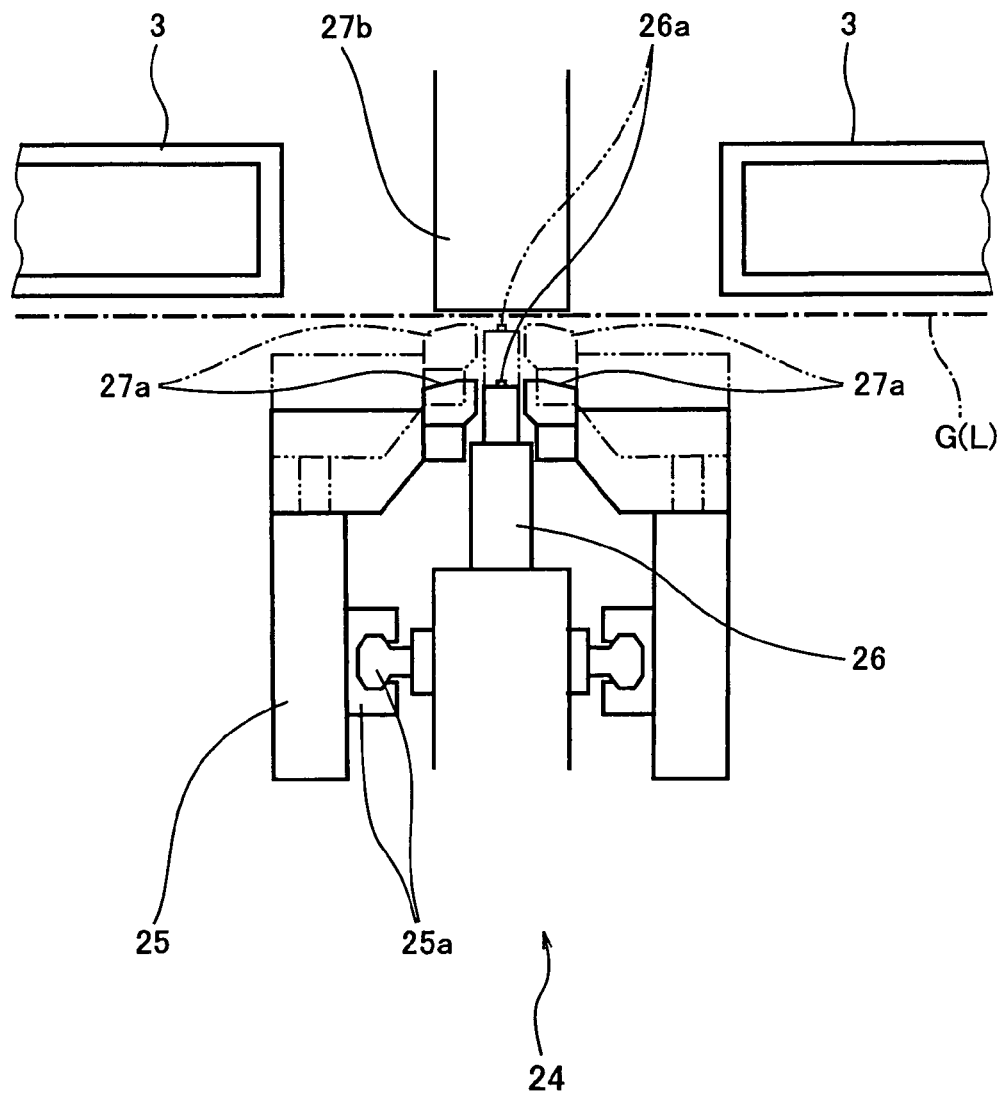
FIG. 8 is a partial plan view schematically showing an example of a scribing unit in the processing line of FIG. 1.

FIG. 8 shows the scribing unit 24. The scribing unit 24 includes a support 25 and a scribing blade holder 26 that is mounted to the support 25 and is moved up and down by a linear guide mechanism 25a. A scribing blade 26a is attached to the scribing blade holder 26. The scribing blade 26a is moved close to and away from the glass plate G by a drive unit such as a cylinder or the like. A solid line indicates a state in which the scribing blade 26a is away from the pass line L and a two-dotted line indicates a state in which the scribing blade 26a is in contact with the glass plate G. The scribing blade 26a is disposed on the opposite side of the fluid guide 3 with respect to the pass line L.

The scribing unit 24 further includes a clamp 27a for clamping both regions of the glass plate G with respect to a vertical movement path of the scribing blade 26a. A support pad 27b is disposed on the opposite side of the scribing blade 26a with respect to the pass line L. The support pad 27b has a surface parallel to the surface of the glass plate G. The support pad 27b is disposed in parallel with the vertical movement path of the scribing blade 26a and has a length substantially equal to the length of the movement path. The clamp 27a and the support pad 27b sandwich and immobilize the glass plate G from both surface sides. The scribing blade 26a vertically moves up and down to form a vertical scribe line on the surface of the glass plate G.

Figure 9:
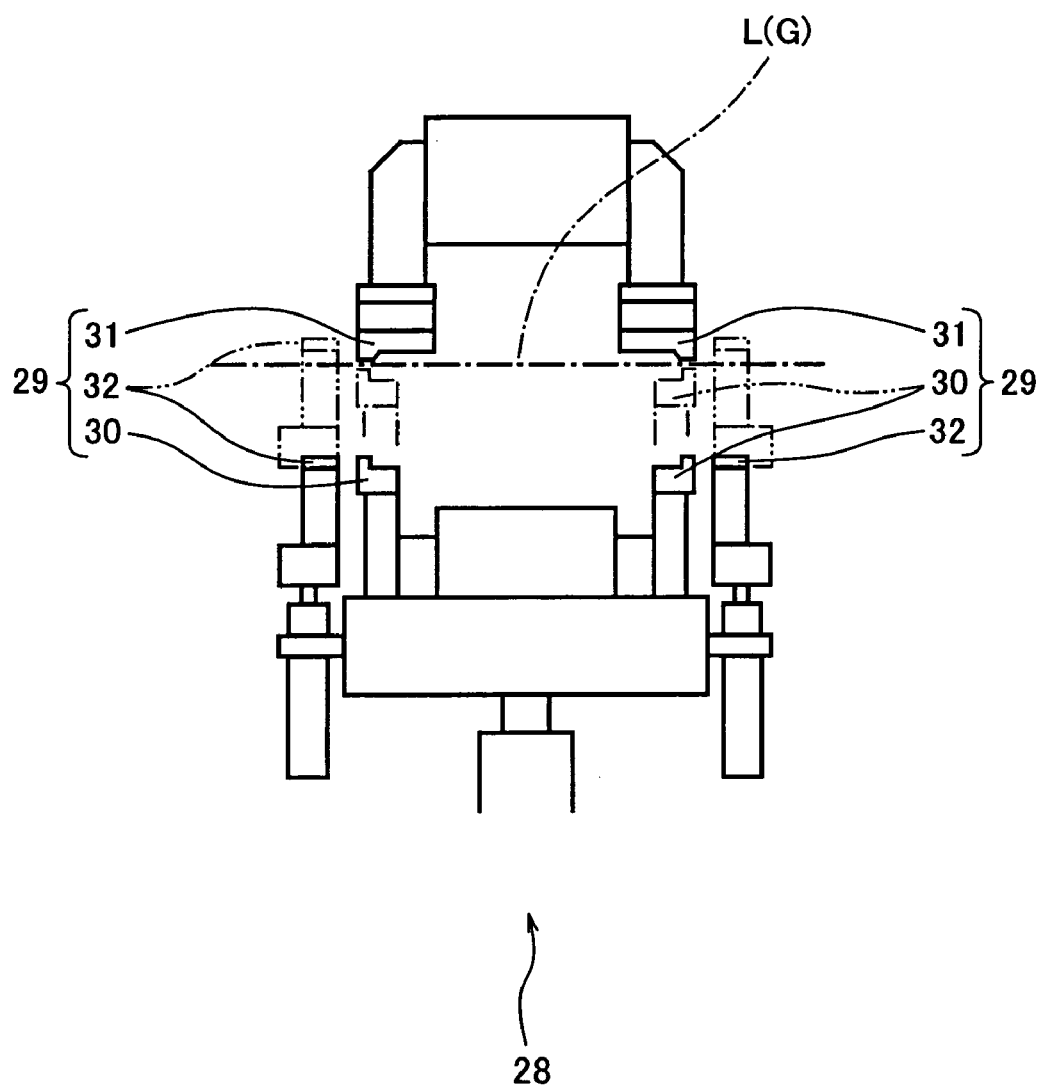
FIG. 9 is a partial plan view schematically showing an example of a venting unit in the processing line of FIG. 1.

FIG. 9 shows a venting unit 28. The venting unit 4 includes a pair of venting elements 29 disposed to be spaced a predetermined distance apart in the conveyance direction. Each venting element 29 includes a clamp 30, a trim receiver 31, and a venting bar 32 disposed adjacent the clamp 30 in the conveyance direction. The venting bar 32 is an elongate member extending vertically, and is disposed in parallel with the surface of the glass plate G being conveyed. The venting element 29 located on upstream side is constructed such that the venting bar 32 is located upstream of and adjacent the clamp 30, and the venting element 29 located on downstream side is constructed such that the venting bar 32 is located downstream of and adjacent the clamp 30. The clamp 30 and the venting bar 32 are each moved toward and away from the glass plate G by the drive cylinder or the like. The venting bar 32 is moved beyond the pass line L to the trim receiver 31 side. The clamp 30 and the trim receiver 31 hold a region adjacent and parallel to the scribe line of the glass plate G. The venting bar 32 moves to push a trim region of the glass plate G to vent the glass plate G along the scribe line.

Figure 10:
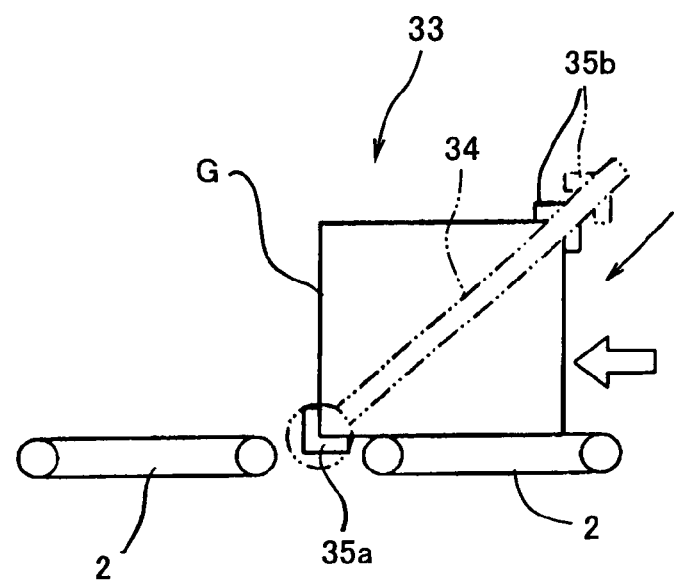
FIG. 10(a) and FIG. 10(b) are front views schematically showing a turn device in the processing line of FIG. 1.
Figure 10:
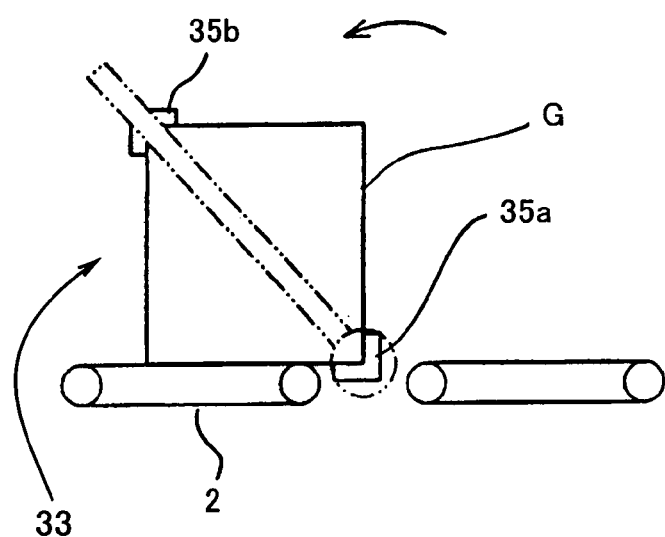

FIG. 10 shows the turn unit 33. FIG. 10(a) shows a state of the glass plate G before being turned and FIG. 10(b) shows a state after the glass plate G is rotated 90 degrees within a plane thereof. The turn unit 33 includes a rotating arm 34 for holding the glass plate G and a drive unit (not shown) for rotating the rotating arm 34 by 90 degrees in forward and backward direction of the pass line L. The drive unit is disposed substantially as high as or lower than the belt conveyor 2 of the conveyance device 10. Engagement members 35a and 35b are respectively attached to a base portion and an end portion of the rotating arm 34 to engage with corner portions of the glass plate G. The engagement member 35b at the end portion is attached to be position-changeable in the longitudinal direction of the rotating arm 34 according to a size of the glass plate G. The engagement members 35a and 35b enable the glass plate G to be immobilized to the rotating arm 34.

Figure 11:
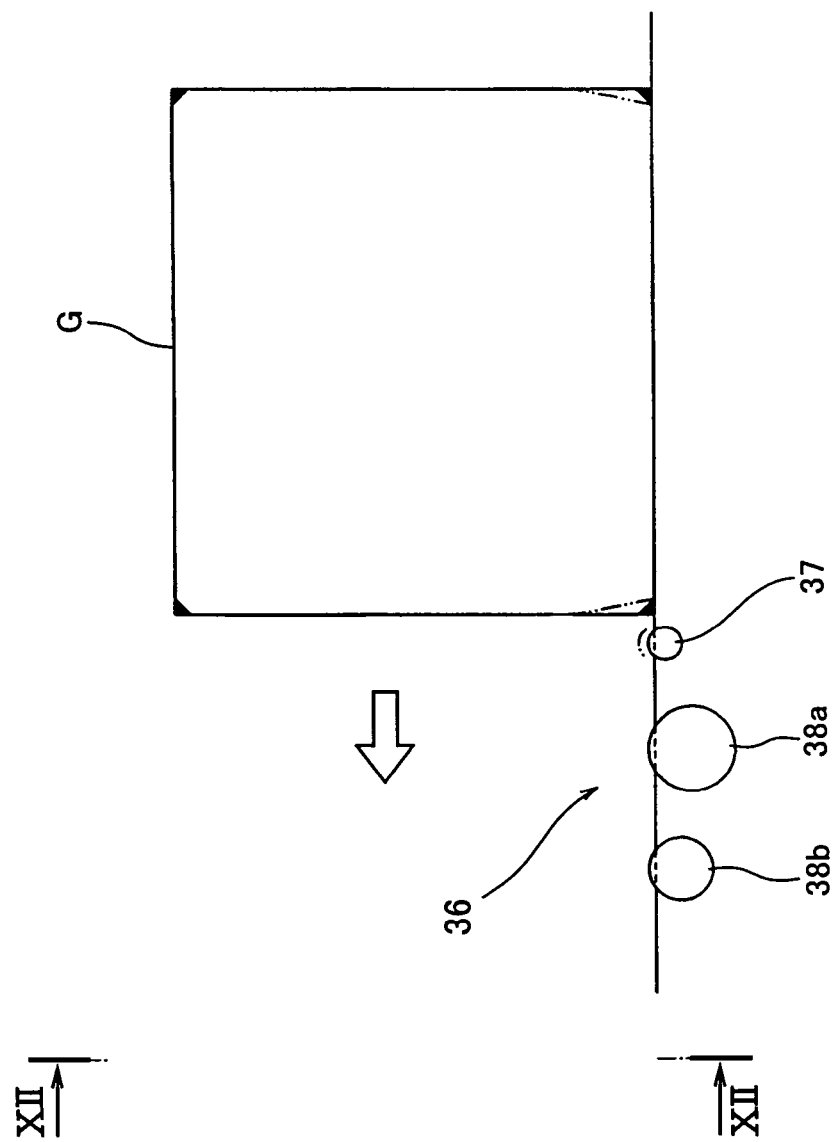
FIG. 11 is a front view schematically showing an example of a chamfering unit in the processing line of FIG. 2.
Figure 12:
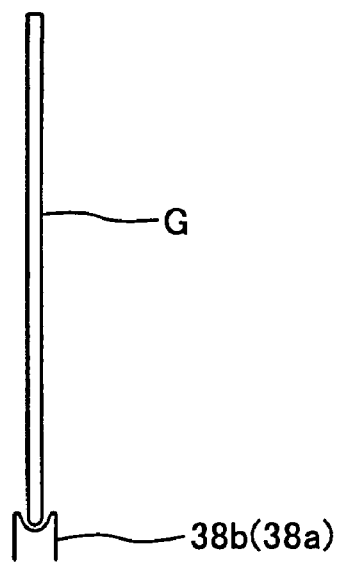
FIG. 12 is a view taken in the direction of arrows along line XII-XII of FIG. 11.

FIGS. 11 and 12 show the chamfering unit 36. The chamfering unit 36 includes a corner chamfering element 37 that chamfers corner portions of the glass plate G and a edge chamfering element (grinding element 38a and polishing element 38b) to form peripheral edge regions of the glass plate G into a predetermined shape (e.g., curved shape). In this embodiment, rotary grinding stones are used as the elements 37, 38a, and 38b, but tools such as a belt sander may be used. Since the elements 37, 38a, and 38b are positioned opposite to the lower end of the glass plate G, the belt conveyor 2 is not mounted in a region corresponding to the elements 37, 38a, and 38b.

The corner chamfering element 37 processes and remove regions of the glass plate G indicated by two-dotted lines and corner regions of the glass plate G indicated by black color in FIG. 11. During the processing, the corner chamfering element 37 is moved up and down while the glass plate G is conveyed. As shown in FIG. 12, the edge chamfering element 38 processes the edge in curved shape. The turn device 13 turns the glass plate G to process four corners and four edges of the glass plate G.

Figure 13:
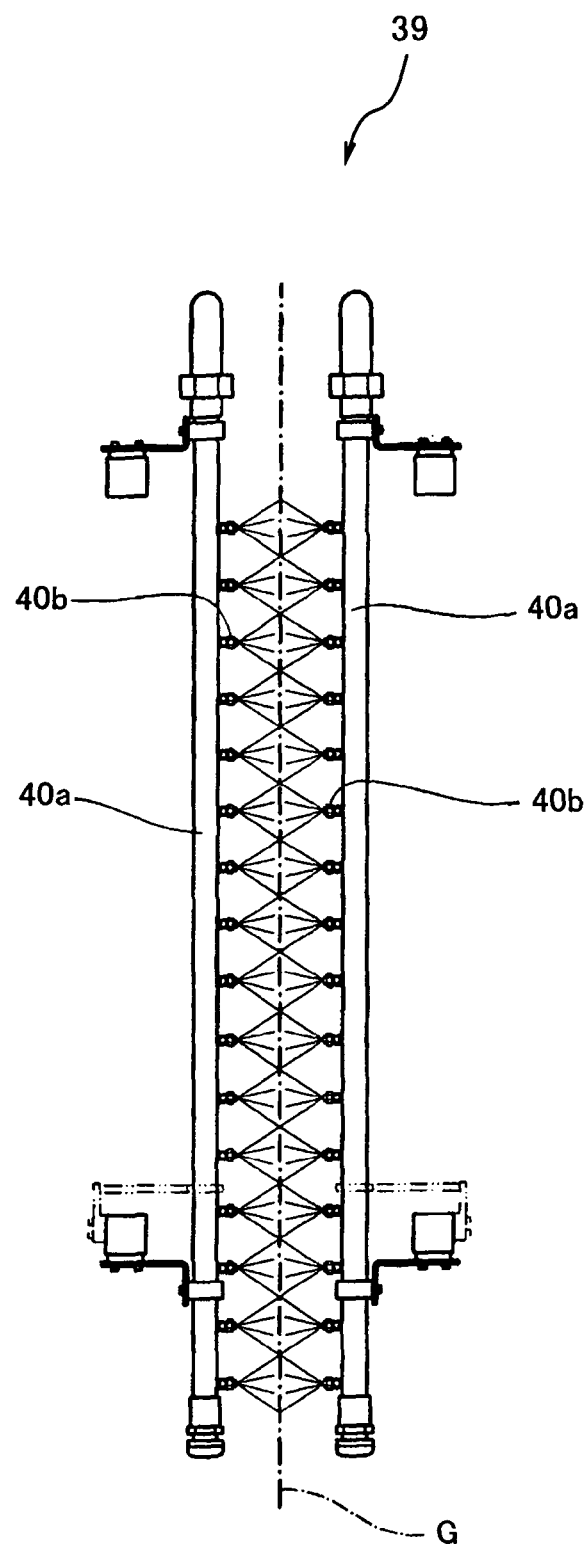
FIG. 13 is a side view schematically showing an example of a water washing unit in the processing line of FIGS. 3 and 4.

FIG. 13 shows a water washing unit 39. The water washing unit 39 is in some cases called a rinsing unit depending on where the water washing unit 29 is located on the line L, for example, when the water-washing unit 39 is used to water-wash the glass plate G after the acid treatment or after cleaning liquid washing. The illustrated water washing unit 39 includes water supply pipes 40a vertically provided on both sides with respect to the pass line L and a number of water nozzles 40b aligned in the longitudinal direction of the water supply pipes 40a. Water is ejected from the nozzles 40b to the surface of the glass plate G to thereby wash away the dusts, the cullet particles, the cleaning liquid, the acid treatment liquid adhering to the surface of the glass plate G in upstream stages.

The water supply pipes 40a may be oriented in a vertical position as in the water washing device 17 located at the middle in FIG. 3 or the water washing device 17 located the second position in FIG. 4, or otherwise may be oriented to be slightly tilted from vertical in the upstream direction as in the water washing device 17 located at the fourth position in FIG. 4.

The cleaning agent washing unit has a construction identical to that of the water washing unit 39, and will not be illustrated and described in detail. It should noted that the cleaning liquid is supplied to the fluid guide 3 and is ejected through fluid ejecting holes 5a. The cleaning liquid removes the oil from the surface of the glass plate G. When the fluid guides 3 are mounted on both sides with respect to the pass line L to eject the cleaning liquid, it is not necessary to mount the water supply pipes 40a.

Figure 14:
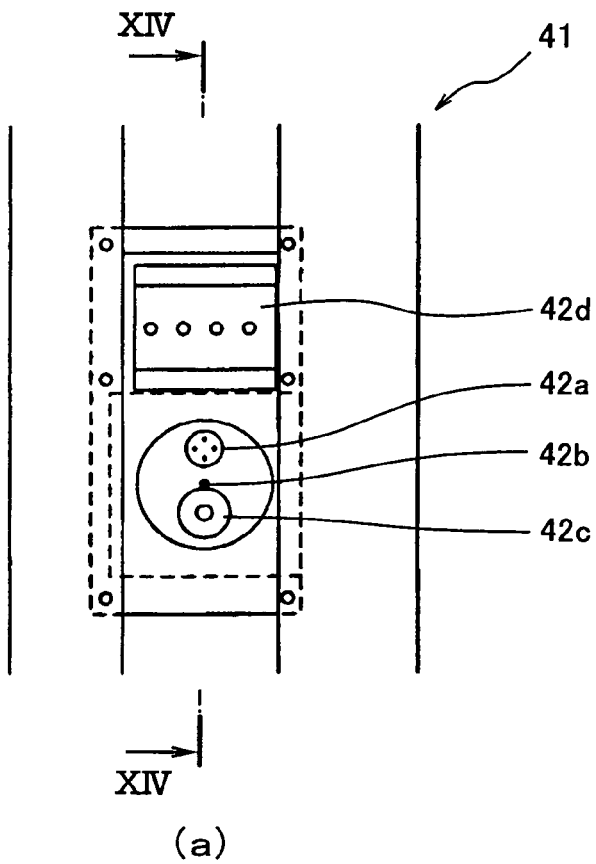
FIG. 14(a) is a partial front view schematically showing an example of a high-pressure water spray unit in the processing line of FIG. 4
FIG. 14(b) is a cross-sectional view taken along line XIV-XIV of FIG. 14(a)
Figure 14:
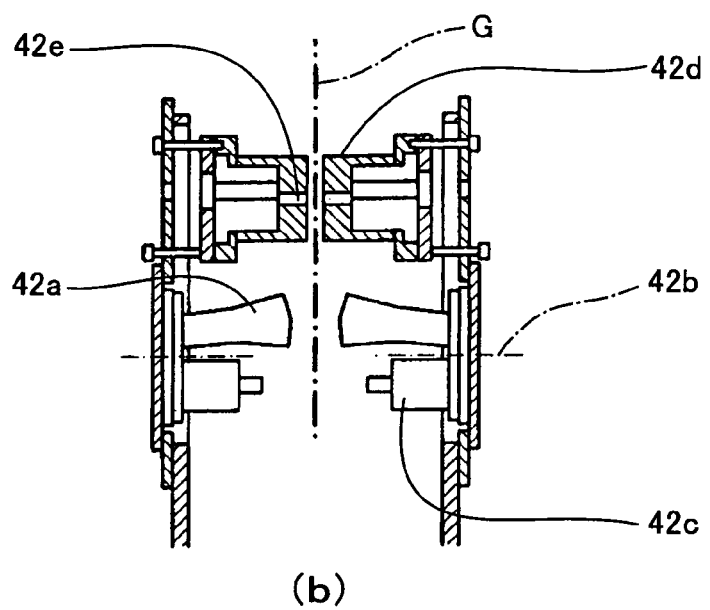

FIG. 14 shows a high-pressure water spray unit 41. The unit 41 includes nozzle support frames 42 which are disposed on both sides with respect to the pass line L and have the same construction. High-pressure liquid spray nozzles 42a are mounted to the respective nozzle support frames 42. FIG. 14(a) is a front view showing the unit 41 on one side and FIG. 14(b) is a cross-sectional view taken along line XIV-XIV thereof, showing the support frames 42 and the nozzles 42a on both sides. High-pressure water jet is ejected from the high-pressure liquid spray nozzles 42a. The high-pressure liquid spray nozzle 42a positioned on both sides with respect to the pass line L face each other so that the pressures applied to the both surfaces of the glass plate G by the high-pressure water jet from the high-pressure liquid spray nozzles 42a are balanced. Alternatively, a plurality of high-pressure liquid spray nozzles 42a may be vertically mounted to the nozzle frames 42, or otherwise the high-pressure liquid spray nozzle 42a may be moved up and down in parallel with the surface of the glass plate G. The high-pressure water spray removes the dust or the like from the surface of the glass plate G.

The high-pressure liquid spray nozzle 42a is configured to rotate around a rotational axis 42b extending in a direction perpendicular to the glass plate G. Since each nozzle 42a vertically moves while rotating, a few nozzles 42a are able to wash a wide region of the glass plate G. Reference symbol 42c designates a balance weight to stabilize the rotation of the high-pressure liquid spray nozzle 42a.

Furthermore, movable fluid guides 42d are mounted to be movable up and down together with the high-pressure liquid spray nozzles 42d to inhibit vibration of the glass plate G due to the high-pressure water jet ejected from the high-pressure liquid spray nozzles 42a. The movable fluid guides 42d are disposed on both sides with respect to the pass line L so as to face each other. As shown in FIG. 14(b), the movable fluid guides 42d are disposed either above or below the high-pressure liquid spray nozzles 42a, but the construction of the present invention is not limited to this. For example, the movable fluid guides 42d may be disposed above and below, on right and left sides, or otherwise above and below and on right and left sides. In FIG. 14(b), reference symbol 42 designates a fluid ejecting hole.

Figure 15:
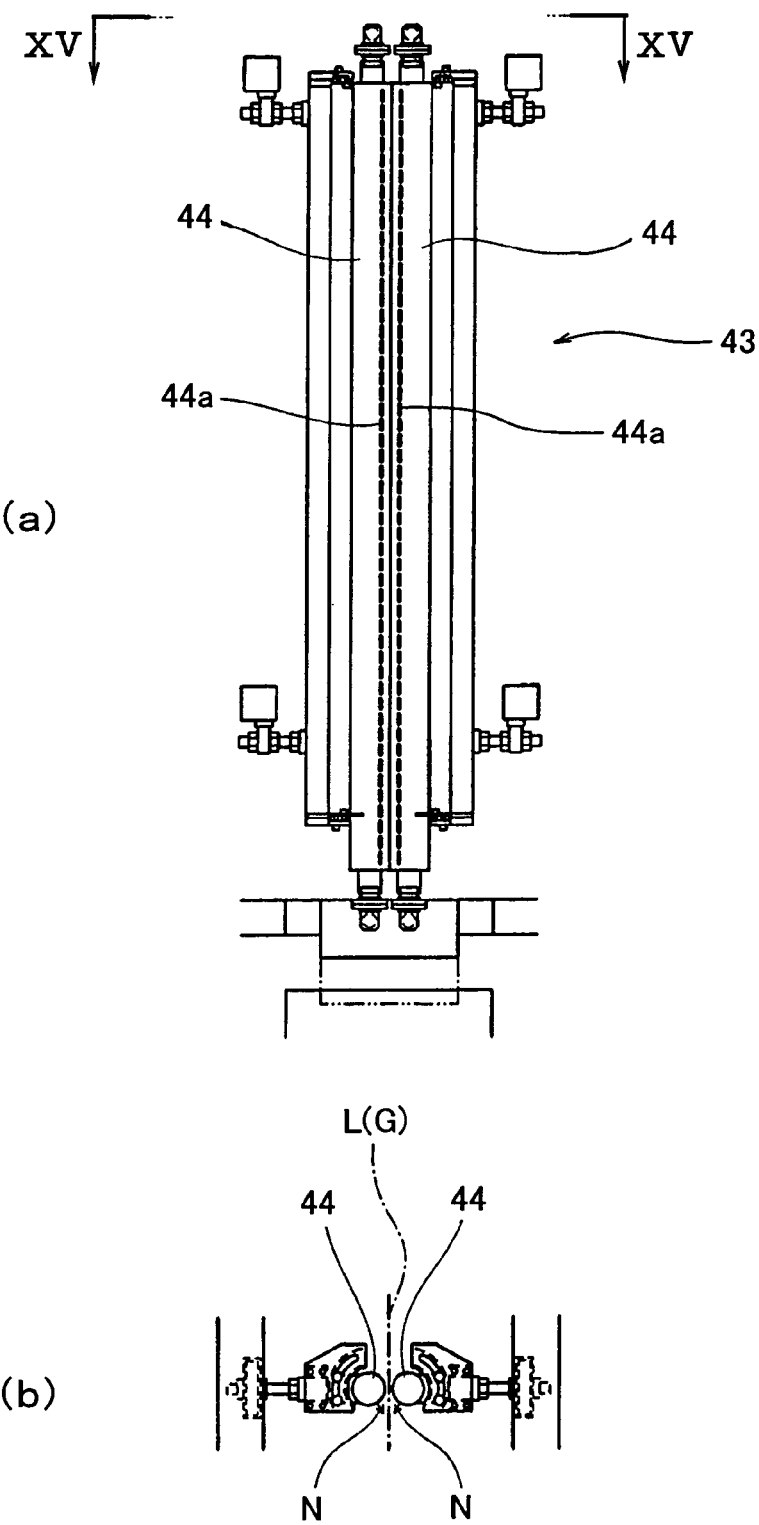
FIG. 15(a) is a partial side view schematically showing an example of a water removing unit in the processing line of FIG. 4.
FIG. 15(b) is a view taken in the directions of arrows along line XV-XV of FIG. 15(a)

FIG. 15 shows the water removing unit 43. FIG. 15(a) is a side view showing the water removing unit 43 as viewed from upstream toward downstream in the pass line direction, and FIG. 15(b) is a view taken in the direction of arrows along line XV-XV of FIG. 15(a), and a plan view of the water removing unit 43. As can be seen from FIG. 1, the water removing unit 43 includes air supply pipes (air knife frames) 44 which are mounted on both sides with respect to the pass line L and extend to be tilted slightly in the upstream direction from vertical. Super-clean air is forcibly delivered from an air supply source (not shown) to each air supply pipe 44. As shown in FIG. 15, each air supply pipe 44 has a slit 44a with a small width through which air is blown to the surface of the glass plate G. The water removing unit 43 is configured to eject a membranous air jet N from both sides of the pass line L to the corresponding regions of the both surfaces of the glass plate G. The slit 44a is formed to extend continuously or at small intervals in the longitudinal direction of the air supply pipe 44. In either configuration, the membranous high-pressure air jet N is blown to the glass plate G entirely in the vertical direction (slightly tilted in the upstream direction). The air jet is ejected at a velocity approximately as high as a sound velocity. The air jet is called air knife N.

As shown in FIG. 15, each air supply pipe 44 is rotatable around a longitudinal center axis thereof. Thereby, the direction of the air knife N changes. For example, the air knife N can be ejected in the direction perpendicular to the surface of the glass plate G or otherwise in the upstream direction or in the downstream direction from the direction perpendicular to the surface of the glass plate G. By ejecting the air knife N slightly in the upstream direction by rotating the air supply pipe 44 tilted slightly in the upstream direction from the vertical direction, the air knife N can blow away the water from the surface of the glass plate G slightly downward in the upstream direction. As a result, the water is blown away downward in the upstream direction with respect to the air knife flame 44, and does not move in the downstream direction. Through the air knife N, the water and so on is removed from the entire surface of the glass plate G and thus the glass plate G is dried.

Figure 16:
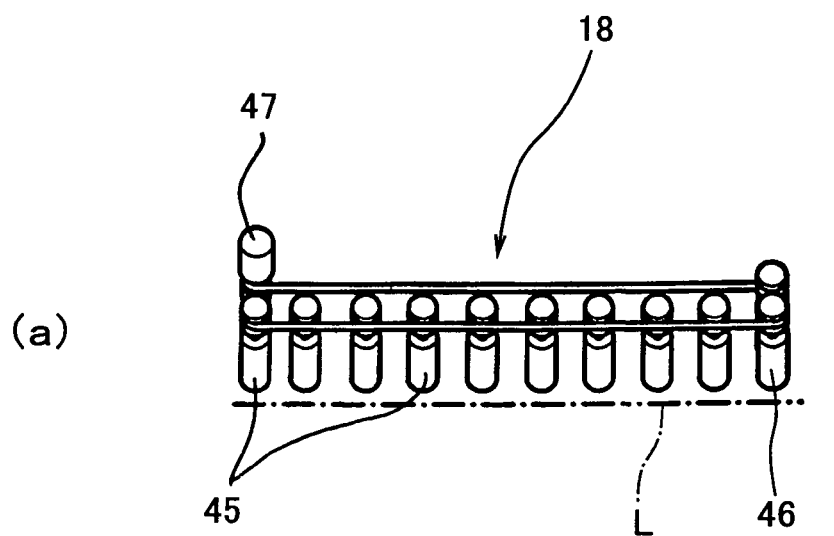
FIG. 16(a) is a schematic perspective view of the acid treatment device of FIG. 16(b) as viewed from obliquely above and FIG. 16(b) is a front view schematically showing an example of an acid treatment device in the processing line of FIG. 3.
Figure 16:
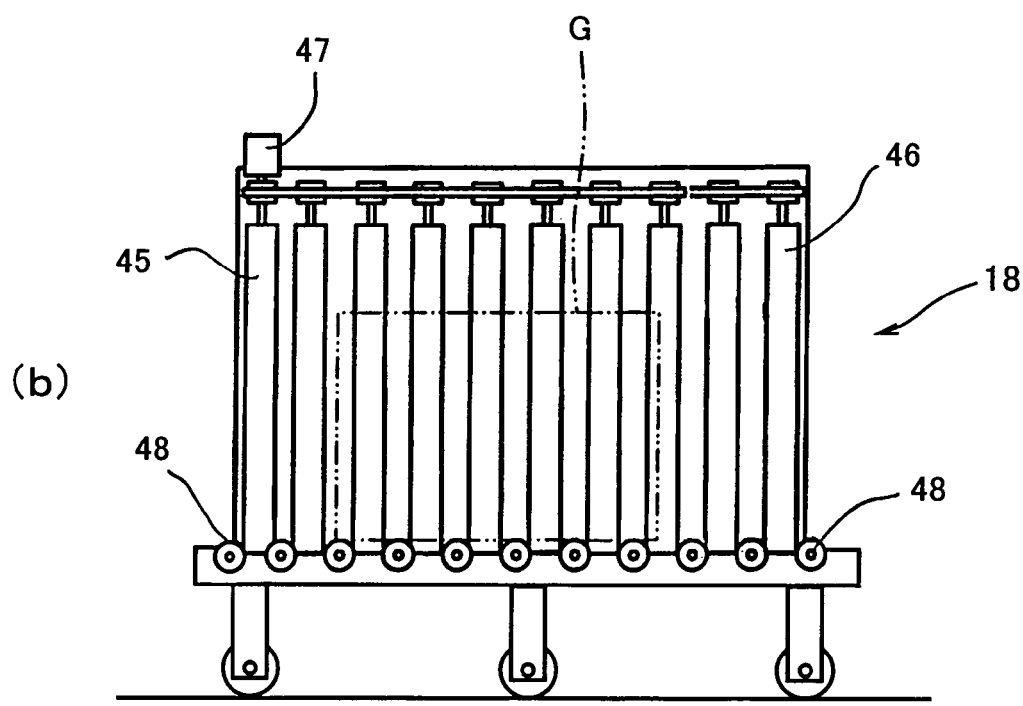

FIG. 16 shows the acid treatment device 18. FIG. 16(a) is a plan view of the acid treatment device 18 and FIG. 16(b) is a front view thereof.

Instead of the fluid guides or the belt conveyor, the acid treatment device 18 has a plurality of rollers aligned in parallel along the pass line L on one side of the pass line L, i.e., on the side where the surface of the glass plate G is subjected to acid treatment. One of these rollers, which is located at upstream end, is a water removing roller 46 and the other rollers are acid treatment rollers 45. The rollers 45 and 46 are chain-driven by one motor 47, but other known transmission mechanism may be employed. All the rollers extend vertically. Because of the surface tension of an acid treatment liquid membrane formed on the surface of the acid treatment roller 45, the glass plate G is suctioned onto the acid treatment rollers 45, maintaining the glass plate G in the substantially upright position. In order to stabilize the glass plate G, the rollers may be tilted slightly outward from the pass line L. Whereas the acid treatment rollers 45 are mounted only on one side of the pass line L because the unit that subjects only one surface of the glass plate G to the acid treatment is illustrated in this embodiment, they may be arranged on both sides with respect to the pass line L because the unit that subjects the both surfaces of the glass plate G to the acid treatment is illustrated in this embodiment. Or, the acid treatment liquid may be sprayed directly to the surface of the glass plate G.

Since the water removing roller 46 and the acid treatment rollers 45 rotate around their center axes, the glass plate G in contact with these rollers are moved in the direction of the pass line L. In other words, the rollers 45 and 46 serve as the conveyance unit. Therefore, the acid treatment device 18 is not equipped with a belt conveyor. Rotatable rollers 48 are aligned to support the lower end of the glass plate G. The rotatable rollers 48 are called free rollers.

On the opposite side of the acid treatment roller train with respect to the pass line L, acid treatment liquid headers (not shown) are mounted to supply the acid treatment liquid to all the acid treatment rollers 45 except the water removing roller 46. Each acid treatment liquid header has a plurality of ejecting holes at a region opposite to the glass plate G, through which the acid treatment liquid is ejected. Through the ejecting holes, the acid treatment liquid is supplied to all the acid treatment rollers 45. The acid treatment roller 45 has a surface formed of porous material such as sponge. Therefore, the acid treatment liquid supplied through the ejecting holes sink in the entire surface of the porous acid treatment roller, and the acid treatment liquid oozes out onto the surface. The acid treatment liquid is supplied to the surface of the glass plate G in contact with the acid treatment rollers 45.

Whereas the water removing roller 46 has a surface formed of a porous water-absorbing material such as the sponge, it is in a dry state because no liquid is supplied thereto. Since the glass plate G is conveyed in contact with the water removing roller 46, the water existing on the acid treatment surface is absorbed into and removed by the water removing roller 46. As a result, excess water is removed from the acid treatment surface of the glass plate G, and thus, a variation in a concentration in the acid treatment liquid supplied is suppressed. A dehydration rod member or the like may be equipped on the opposite side of the water removing roller 46 with respect to the pass line L, although not shown.

The acid treatment rollers 45 may be replaced by acid treatment members formed of an elongate plate shape. This acid treatment member is constituted such that a porous material covers a surface of a plate-shaped core element. The core element has supply holes through which the acid treatment liquid is supplied to the surface thereof opposite to the glass plate G. The acid treatment liquid is supplied to the supply hole. Thereby, the acid treatment liquid sinks in the surface of the acid treatment member formed of the porous material and the acid treatment liquid oozes out from the surface. In this case, since the acid treatment member is unable to convey the glass plate G, it is necessary to mount the belt conveyor 2. Because of the surface tension of the acid treatment liquid, the glass plate G is suctioned onto the acid treatment member while the glass plate is in contact with the liquid membrane of the surface of the acid treatment member. Therefore, all the acid treatment members may be mounted in a vertical position.

Figure 17:
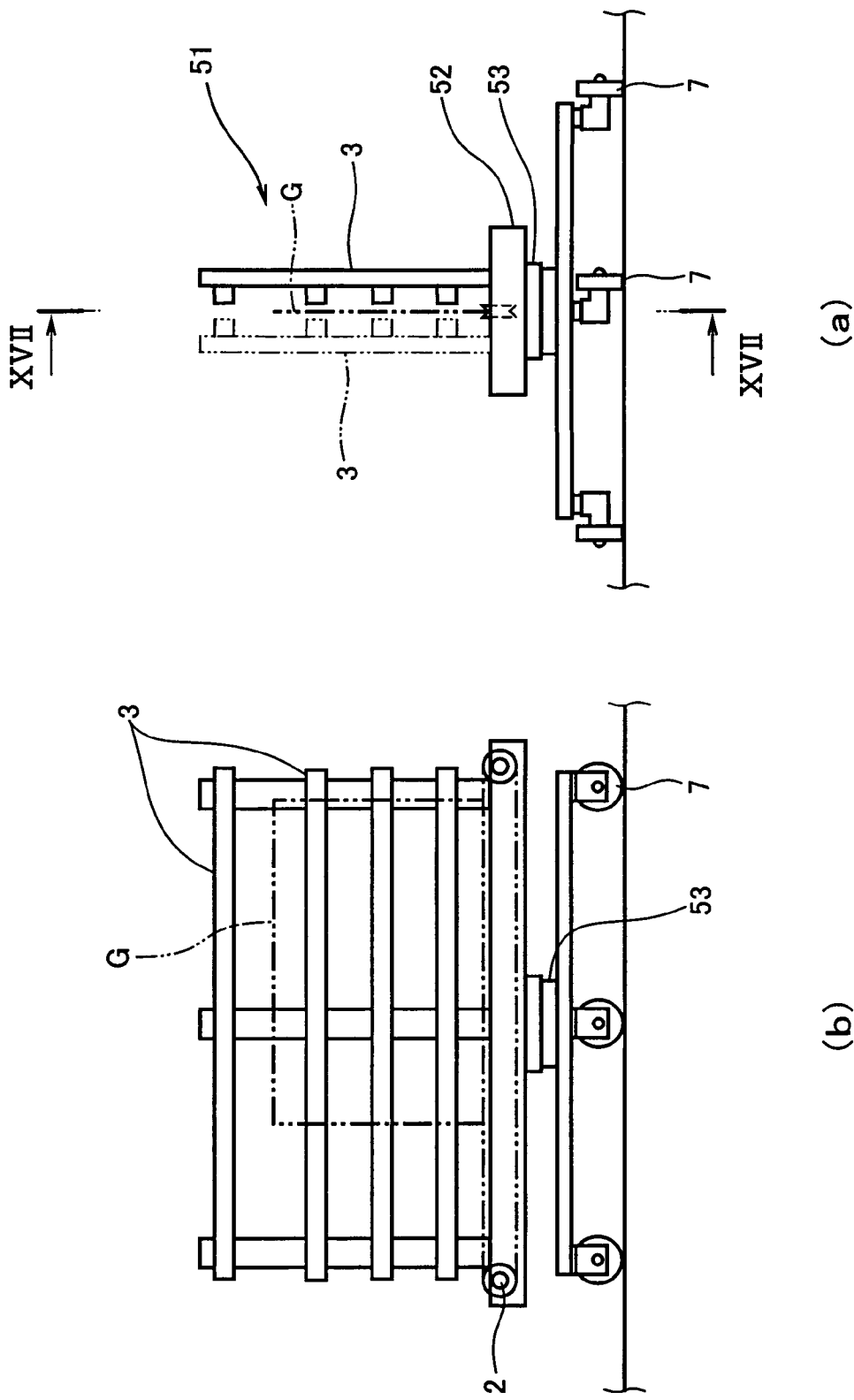
FIG. 17(a) is a side view of a direction conversion device applied to the processing line of FIG. 1
FIG. 17(b) is a cross-sectional view taken in the direction of arrows along line XVII-XVII of FIG. 17(a)

FIG. 17 shows the direction conversion device 51. The direction conversion device 51 has a platform 52 that is different from that of the conveyance device 10 (FIG. 5). A direction conversion unit 53 is mounted on the platform 52 and converts direction within a horizontal plane. The belt conveyor 2 and the fluid guide 3 are mounted onto the direction conversion unit 53. By converting the direction of the direction conversion unit 52, the belt conveyor 2 and the fluid guide 3 convert direction together to change the direction in which the glass plate G is conveyed. The platform 52 has casters 7 that are disposed to be equally spaced apart in a circumferential direction to maintain stability regardless of the direction conversion of the belt conveyor 2 and the fluid guide 3.

Figure 18:
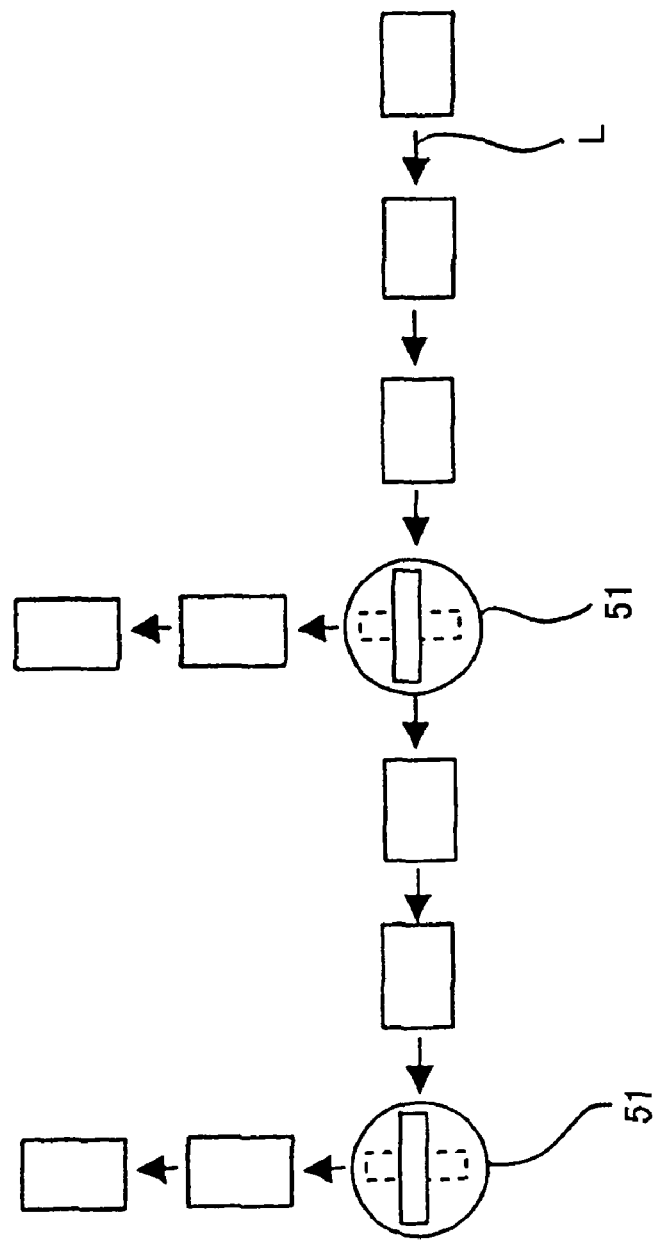
FIG. 18 is a plan view schematically showing another arrangement of the devices in the glass plate processing line according to the embodiment of the present invention.

As shown in FIG. 18, the direction conversion devices 51 are coupled to the line L to convert the conveyance direction of the glass plate G being conveyed along a straight line so as to form a right angle. By branching the line L at the direction conversion device 51 as shown in FIG. 15, the glass plate G is extracted and kept in a specified position between the stages if a buffering function is required as in a general process line.

Figure 19:
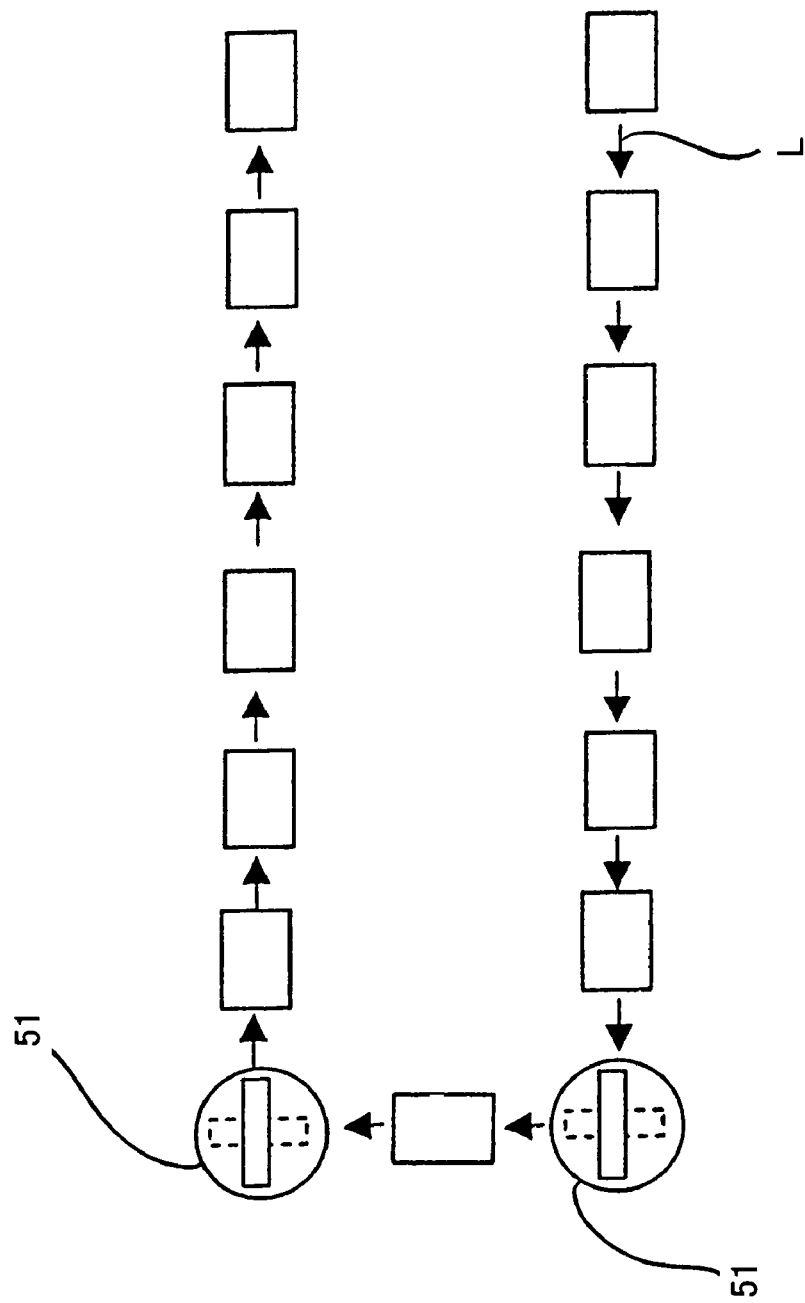
FIG. 19 is a plan view schematically showing another arrangement of the devices in the glass plate processing line according to the embodiment of the present invention.

As shown in FIG. 19, by coupling two direction conversion devices 51 in series, the direction of the line L is further converted so as to form a right angle so that a downstream line becomes parallel to an upstream line. Thus, an installation space can be saved. The direction may be converted to form an angle other than the right angle.

Figure 20:
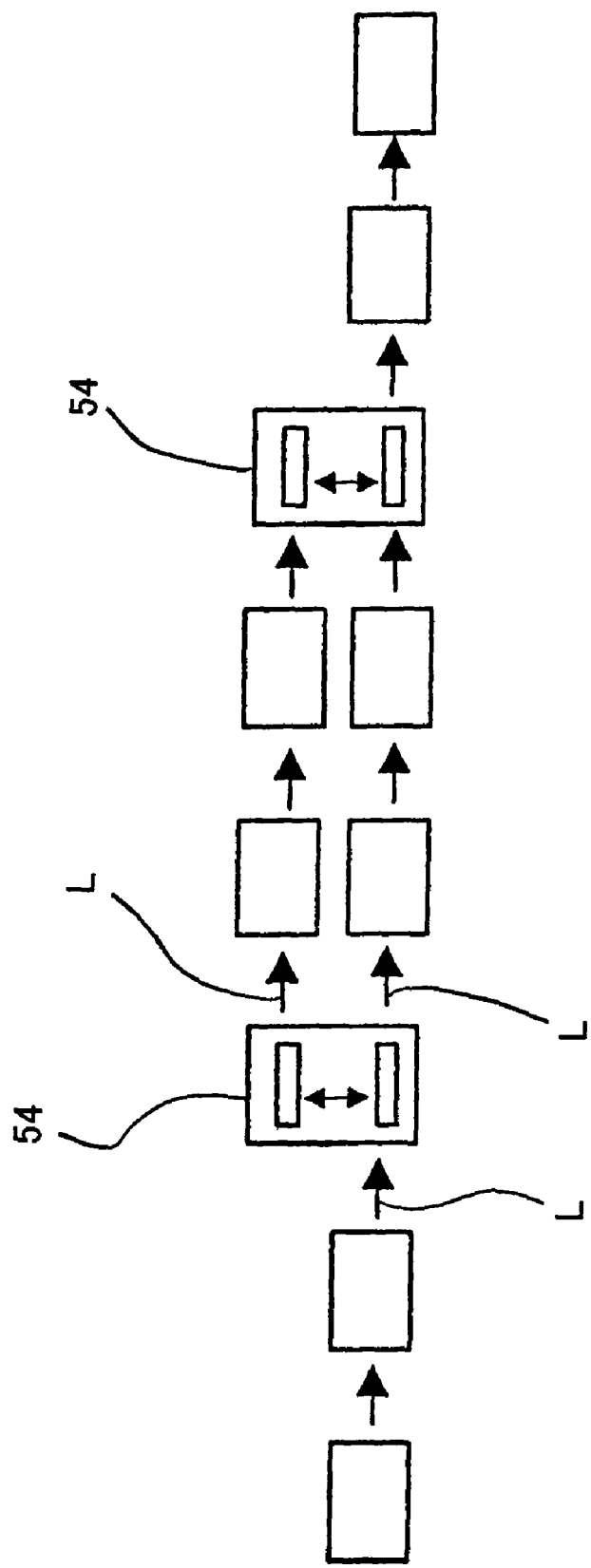
FIG. 20 is a plan view schematically showing another arrangement of the devices in the glass plate processing line according to the embodiment of the present invention.

As shown in FIG. 20, a parallel-shift device (line branch device) 54 capable of sliding the belt conveyor and the fluid guide in a direction perpendicular to the pass line L using the platform 52 may be employed. By coupling the parallel-shift device 54 to the line L, the line L may branched and converted into plural lines for steps requiring longer time than other steps, for example, the chamfering step. By installing rails on the platform 52 and by installing the belt conveyor and the fluid guide on a movable board engageable with the rails, the parallel-shift device 54 enables the belt conveyor and the fluid guide to parallel-shift together by a feeding screw method of a ball-type screw. Instead of the feeding screw method, a known drive unit such as a hydraulic cylinder may be used to move the belt conveyor and the fluid guide.

In the above described embodiment, the respective process units are removably mounted to the conveyance devices which are the bases, but the construction of the present invention is not limited to this. For example, one unit may be fixedly mounted to one conveyance device to constitute a processing unit.

While the present invention has been described with reference specific examples, which are intended to be illustrative only and not to be limiting of the invention, it will be apparent to those of ordinary skill in the art that changes, additions or deletions may be made to the disclosed embodiments without departing from the spirit and scope of the invention.

INDUSTRIAL APPLICABILITY

In accordance with the present invention, scribing, venting, washing, chamfering, etc can be performed for various large-sized and thinned plates without deteriorating their quality.

The invention claimed is:

1. A plate material vertical processing line comprising:
   a plurality of processing devices each having a modular structure;
   wherein each of the processing devices includes a platform; a conveyance means that is mounted on the platform and is configured to convey a plate material placed in a substantially upright position while supporting a lower end of the plate material; and a fluid guide that is mounted on the platform and is configured to apply a fluid pressure to a surface of the plate material to support the plate material in the substantially upright position and in a non-contact state; and
   wherein the plurality of processing devices includes a combination of at least one processing apparatus selected from a scribing device, a venting device for trimming the plate material, and a chamfering device, and at least one processing apparatus selected from a cleaning agent washing device, a water washing device, a high-pressure water spray device, and a plate material turn device.

2. The plate material vertical processing line according to claim 1, further comprising:
   a direction conversion device of the plate material;
   wherein the direction conversion device includes a platform; a conveyance means that conveys the plate material in the substantially upright position while supporting the lower end of the plate material; a fluid guide that supports the plate material in the non-contact state; and a direction conversion means that is mounted on the direction conversion device platform and is configured to convert a direction of conveyance of the direction conversion device conveyance means and a direction of guidance of the direction conversion device fluid guide from one horizontal direction to another.

3. The plate material vertical processing line according to claim 1, further comprising:
   an acid treatment device of the plate material;
   wherein the acid treatment device includes a platform; a conveyance means that is mounted on the acid treatment device platform and is configured to convey the plate material placed in the substantially upright position while supporting the lower end of the plate material; and an acid treatment means that is mounted on the acid treatment device platform and is configured to subject the surface of the plate material to acid treatment.

4. The plate material vertical processing line according to claim 1, further comprising:
   a tilting device of the plate material;
   wherein the tilting device includes a platform; a conveyance means that is mounted on the tilting device platform and is configured to convey the plate material placed in the substantially upright position while supporting the lower end of the plate material; and a fluid guide capable of being tilted in a direction perpendicular to the surface of the plate material.

5. The plate material vertical processing line according to claim 1, further comprising:
   a parallel-shift device of the plate material;
   wherein the parallel-shift device includes a platform; a conveyance means that conveys the plate material placed in the substantially upright position while supporting the lower end of the plate material; a fluid guide that supports the plate material in the non-contact state; and a linear reciprocation means that is mounted on the parallel-shift device platform and is configured to move the parallel-shift device conveyance means and the parallel-shift device fluid guide in a direction perpendicular to a direction in which the plate material is conveyed.

6. The plate material vertical processing line according to claim 1, wherein each of the platforms has casters at a lower end thereof.

7. The plate material vertical processing line according to claim 1, wherein each of the processing devices has a coupling member by which the respective processing device is removably coupled to its adjacent processing device.

8. A plate material vertical processing line comprising:
   processing units of a plate material; and
   a plurality of conveyance devices each having a modular structure;
   wherein each of the conveyance devices includes:
      a platform;
      a conveyance means that is mounted on the platform and is configured to convey the plate material placed in a substantially upright position while supporting a lower end of the plate material;
      a fluid guide that is mounted on the platform and is configured to apply a fluid pressure to a surface of the plate material to support the plate material in the substantially upright position and in a non-contact state;
      and a mounting element that is mounted on the platform to mount each of the processing units;
   wherein the processing units include a combination of at least one processing unit selected from a scribing unit, a venting unit for trimming the plate material, and a chamfering unit, and at least one processing unit selected from a cleaning agent washing unit, a water washing unit, a high-pressure water spray unit, and a plate material turn unit.

9. The plate material vertical processing line according to claim 8, further comprising:

a direction conversion device of the plate material;

wherein the direction conversion device includes a platform; a conveyance means that conveys the plate material in the substantially upright position while supporting the lower end of the plate material; a fluid guide that supports the plate material in the non-contact state; and a direction conversion means that is mounted on the direction conversion device platform and is configured to convert a direction of conveyance of the direction conversion device conveyance means and a direction of guidance of the direction conversion device fluid guide from one horizontal direction to another.

10. The plate material vertical processing line according to claim 2, further comprising:

an acid treatment device of the plate material;

wherein the acid treatment device includes a platform; a conveyance means that is mounted on the acid treatment device platform and is configured to convey the plate material placed in the substantially upright position while supporting the lower end of the plate material; and an acid treatment means that is mounted on the acid treatment device platform and is configured to subject the surface of the plate material to acid treatment.

11. The plate material vertical processing line according to claim 8, further comprising:

a tilting device of the plate material;

wherein the tilting device includes a platform; a conveyance means that is mounted on the tilting device platform and is configured to convey the plate material placed in the substantially upright position while supporting the lower end of the plate material; and a fluid guide capable of being tilted in a direction perpendicular to the surface of the plate material.

12. The plate material vertical processing line according to claim 8, further comprising:

a parallel-shift device of the plate material;

wherein the parallel-shift device includes a platform; a conveyance means that conveys the plate material placed in the substantially upright position while supporting the lower end of the plate material; a fluid guide that supports the plate material in the non-contact state; and a linear reciprocation means that is mounted on the parallel-shift device platform and is configured to move the parallel-shift device conveyance means and the parallel-shift device fluid guide in a direction perpendicular to a direction in which the plate material is conveyed.

13. The plate material vertical processing line according to claim 8, wherein each of the platforms has casters at a lower end thereof.

14. The plate material vertical processing line according to claim 8, wherein each of the conveyance devices has a coupling member by which the respective conveyance device is removably coupled to its adjacent conveyance device.

* * * * *

UNITED STATES PATENT AND TRADEMARK OFFICE
CERTIFICATE OF CORRECTION

PATENT NO. : 7,891,066 B2
APPLICATION NO. : 10/589928
DATED : February 22, 2011
INVENTOR(S) : Yoshiaki Aoki et al.

Page 1 of 1

It is certified that error appears in the above-identified patent and that said Letters Patent is hereby corrected as shown below:

In the Claims

Claim 10, Column 15, Line 16, delete "claim 2" and insert -- claim 8 --.

Signed and Sealed this
Thirty-first Day of May, 2011

David J. Kappos
*Director of the United States Patent and Trademark Office*